(12) United States Patent
Ichikawa

(10) Patent No.: US 11,203,269 B2
(45) Date of Patent: Dec. 21, 2021

(54) VEHICLE-MOUNTABLE CONTROL DEVICE AND VEHICLE

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 16/578,837

(22) Filed: Sep. 23, 2019

(65) Prior Publication Data

US 2020/0101860 A1    Apr. 2, 2020

(30) Foreign Application Priority Data

Sep. 28, 2018    (JP) .............................. JP2018-183893

(51) Int. Cl.
| | |
|---|---|
| H02J 7/00 | (2006.01) |
| B60L 53/66 | (2019.01) |
| H02J 7/02 | (2016.01) |
| B60L 58/12 | (2019.01) |
| B60L 53/18 | (2019.01) |
| B60L 53/16 | (2019.01) |
| B60K 37/02 | (2006.01) |
| B60L 50/50 | (2019.01) |

(52) U.S. Cl.
CPC .............. *B60L 53/66* (2019.02); *B60K 37/02* (2013.01); *B60L 50/50* (2019.02); *B60L 53/16* (2019.02); *B60L 53/18* (2019.02); *B60L 58/12* (2019.02); *H02J 7/0045* (2013.01); *H02J 7/027* (2013.01); *B60K 2370/1529* (2019.05); *B60K 2370/52* (2019.05); *B60L 2240/622* (2013.01); *B60L 2240/68* (2013.01); *B60L 2250/16* (2013.01)

(58) Field of Classification Search
CPC . B60L 53/66; B60L 50/50; H02J 7/027; H02J 7/0045
USPC ........................................................ 320/109
See application file for complete search history.

(56) References Cited

U.S. PATENT DOCUMENTS

| | | | | |
|---|---|---|---|---|
| 5,757,595 | A * | 5/1998 | Ozawa ..................... | B60L 53/16 340/636.1 |
| 8,487,752 | B2 * | 7/2013 | Stillfried .................. | B60Q 1/50 340/425.5 |
| 10,513,197 | B1 * | 12/2019 | Carpenter ............... | B60L 53/60 |
| 2009/0021364 | A1 * | 1/2009 | Frey ......................... | B60Q 1/50 340/468 |
| 2009/0242291 | A1 * | 10/2009 | Sagawa ................... | B60L 53/65 180/65.265 |

(Continued)

FOREIGN PATENT DOCUMENTS

| | | |
|---|---|---|
| JP | 2011257914 A | 12/2011 |
| JP | 6132011 B2 | 5/2017 |

*Primary Examiner* — Suchin Parihar
(74) *Attorney, Agent, or Firm* — Dinsmore & Shohl LLP

(57) ABSTRACT

A vehicle-mountable control device is mountable on a vehicle including at least one power receiver configured to receive electric power supplied from an external power supply, and includes a controller. The controller is configured to cause a prescribed display device to display a position of the power receiver included in the vehicle. The controller is configured to, when the vehicle includes a plurality of power receivers, cause the prescribed display device to display a position of a predetermined one power receiver of the plurality of power receivers.

11 Claims, 13 Drawing Sheets

(56) References Cited

U.S. PATENT DOCUMENTS

| | | | |
|---|---|---|---|
| 2010/0246198 A1* | 9/2010 | Hook | B60L 53/16 362/459 |
| 2011/0043355 A1* | 2/2011 | Chander | B60K 15/05 340/455 |
| 2012/0218779 A1* | 8/2012 | Sawayanagi | B60L 53/16 362/613 |
| 2016/0089981 A1* | 3/2016 | Kodawara | B60L 50/40 307/10.1 |
| 2017/0197516 A1* | 7/2017 | Yamazaki | B60L 53/16 |
| 2017/0259785 A1* | 9/2017 | Lovett | B60R 25/2018 |
| 2017/0267117 A1* | 9/2017 | Grider | B60L 58/12 |
| 2019/0329706 A1* | 10/2019 | Isaacs | B60Q 9/00 |
| 2020/0101861 A1* | 4/2020 | Ichikawa | B60L 53/16 |

\* cited by examiner

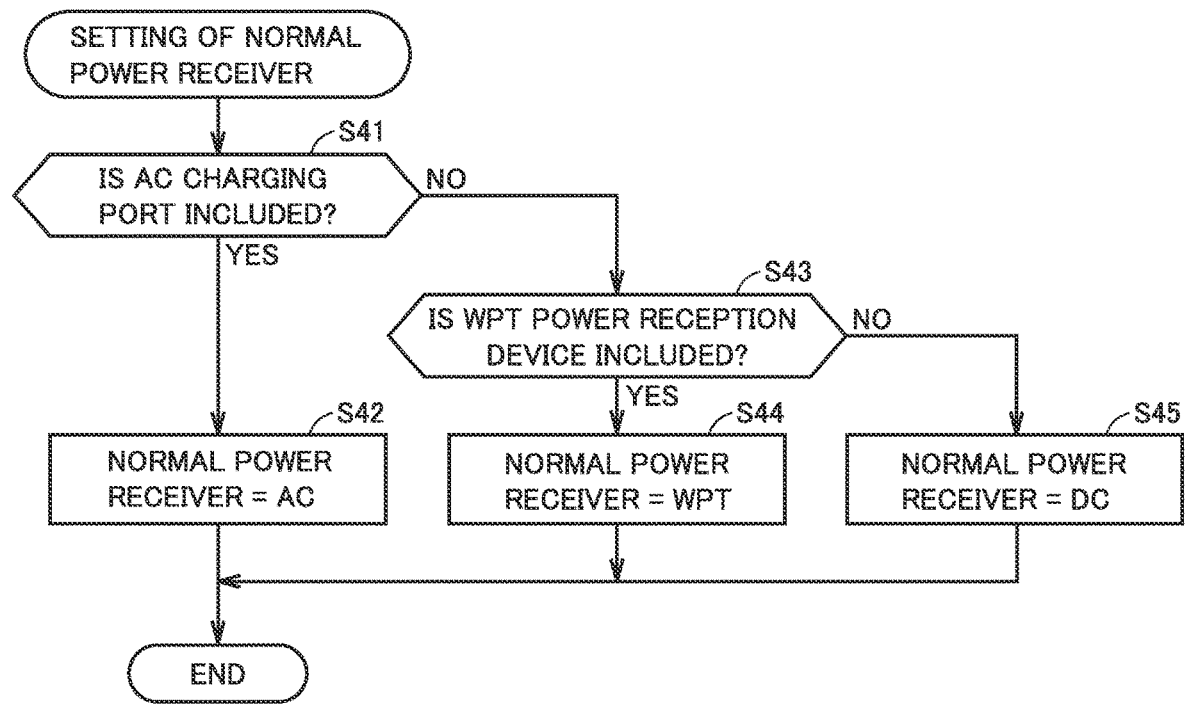

VEHICLE-MOUNTABLE CONTROL DEVICE AND VEHICLE

CROSS REFERENCE TO RELATED APPLICATIONS

This nonprovisional application claims priority to Japanese Patent Application No. 2018-183893 filed on Sep. 28, 2018 with the Japan Patent Office, the entire contents of which are hereby incorporated by reference.

BACKGROUND

Field

The present disclosure relates to a vehicle-mountable control device and a vehicle.

Description of the Background Art

In recent years, from the perspective of environmental conservation, electrically powered vehicle (e.g., electric vehicles or plug-in hybrid vehicles) powered mainly by electric power tend to increase. Such electrically powered vehicles include a portion (hereinafter, referred to as "power receiver") configured to receive electric power supplied from a power feeding facility (i.e., a facility including an external power supply), and charge a vehicle-mounted battery with the electric power received by the power receiver. Various power feeding methods such as an AC power wired power feeding method, a DC power wired power feeding method (e.g., a CHAdeMO method, a CCS (Combined Charging System) method and a GB/T method) and a wireless power feeding method (also referred to as "WPT (wireless power transfer) method") have been proposed as a power feeding method for supplying electric power to a vehicle. A normal charger and a quick charger are known as the main power feeding facility. The AC power wired power feeding method (hereinafter, also referred to as "AC method") is used in the normal charger, and the DC power wired power feeding method (hereinafter, also referred to as "DC method") is used in the quick charger.

A vehicle may in some cases be provided with a plurality of power receivers so as to correspond to a plurality of power feeding methods. For example, Japanese Patent Laying-Open No. 2011-257914 discloses a vehicle including a charging port for normal charging corresponding to a normal charger, and a charging port for quick charging corresponding to a quick charger. Each of the charging port for normal charging and the charging port for quick charging corresponds to the power receiver.

A parking position and an orientation (parking direction) of a vehicle during charging vary from power feeding facility to power feeding facility. Therefore, the vehicle described in Japanese Patent Laying-Open No. 2011-257914 is configured to obtain information about a power feeding facility and determine a parking method (i.e., in which orientation and at which position to park the vehicle) based on the obtained information. The determined parking method is then displayed by a car navigation system.

SUMMARY

An increase in the number of power receivers included in a vehicle has not only advantages but also disadvantages. Examples of the disadvantages include an increase in vehicle weight and an increase in vehicle cost. In order to suppress such disadvantages, it is conceivable to make a power receiver optional. There is a possibility that a vehicle type in which an optional power receiver (i.e., a user can select whether or not to add the power receiver) is set in addition to a power receiver included as standard (hereinafter, also referred to as "standard power receiver") will appear in the future. However, a vehicle-mountable control device corresponding to such a vehicle type has not yet been proposed.

For example, there is a vehicle configured to cause a prescribed display device (e.g., a meter panel) to display a position of a power receiver during traveling. Such a vehicle has mounted thereon a control device (vehicle-mountable control device) configured to cause the display device to display the position of the power receiver. When an optional power receiver is added to such a vehicle, the conventional vehicle-mountable control device that does not prepare for addition of the optional power receiver cannot determine whether to display a position of a standard power receiver, to display a position of the optional power receiver, or to display both the position of the standard power receiver and the position of the optional power receiver.

The present disclosure has been made to solve the above-described problem, and an object of the present disclosure is to provide a vehicle-mountable control device that can cause a display device to suitably display a position of a power receiver even when the vehicle-mountable control device is applied to a vehicle type in which an optional power receiver is set, and to provide a vehicle including the vehicle-mountable control device.

A vehicle-mountable control device according to the present disclosure is a vehicle-mountable control device mountable on a vehicle including at least one power receiver configured to receive electric power supplied from an external power supply, and includes a controller. The controller is configured to cause a prescribed display device to display a position of the power receiver included in the vehicle. The controller is configured to, when the vehicle includes a plurality of power receivers, cause the display device to display a position of a predetermined one power receiver (hereinafter, also referred to as "specified power receiver") of the plurality of power receivers.

According to the above-described vehicle-mountable control device, when the vehicle includes the plurality of power receivers, the position of the predetermined specified power receiver is displayed on the display device. Therefore, even when one optional power receiver is added to a vehicle including only one standard power receiver and thus the vehicle includes a plurality of power receivers, for example, the vehicle-mountable control device can cause the display device to display a predetermined specified power receiver (more particularly, either the standard power receiver or the optional power receiver). Thus, the above-described vehicle-mountable control device can cause the display device to suitably display a position of one power receiver even when the above-described vehicle-mountable control device is applied to a vehicle type in which an optional power receiver is set.

The above-described vehicle-mountable control device may be applied, for example, to a vehicle type in which a charging port for DC power is set as the standard power receiver and a charging port for AC power is set as the optional power receiver.

More specifically, the at least one power receiver may include a charging port connectable to a charging cable. The vehicle may be configured to charge a vehicle-mounted battery with the electric power supplied from the external power supply to the charging port through the charging cable. The vehicle may include at least a charging port for DC power. The vehicle-mountable control device may further include: a determination processor; and a memory. The determination processor may be configured to determine whether or not the vehicle further includes a charging port for AC power. The memory may be configured to store first charging port information indicating a position of the charging port for DC power and second charging port information indicating a position of the charging port for AC power. The controller may be configured to cause the display device to display the position of the charging port for DC power by using the first charging port information, when the determination processor determines that the vehicle does not include the charging port for AC power.

The determination processor can determine whether or not the charging port for AC power (optional power receiver) is added to the vehicle. When the charging port for AC power is not added to the vehicle, the position of the charging port for DC power (standard power receiver) can be displayed on the display device. In addition, since the positional information (first charging port information and second charging port information) of each of the standard power receiver and the optional power receiver is stored in the memory, the work for adding the positional information (second charging port information) of the optional power receiver to the memory is unnecessary even when the optional power receiver is retrofitted to the vehicle.

The predetermined one power receiver (specified power receiver) may be the charging port for AC power. The controller may be configured to cause the display device to display the position of the charging port for AC power by using the second charging port information, when the determination processor determines that the vehicle includes the charging port for AC power.

As described above, when the charging port for AC power is added to the vehicle, the position of the charging port for AC power is displayed on the display device. Therefore, the user can be preferentially notified of the position of the charging port for AC power corresponding to the normal charger that is currently in widespread use.

The above-described vehicle-mountable control device may be applied, for example, to a vehicle type in which the charging port for AC power is set as the standard power receiver and the charging port for DC power is set as the optional power receiver.

More specifically, the at least one power receiver may include a charging port connectable to a charging cable. The vehicle may be configured to charge a vehicle-mounted battery with the electric power supplied from the external power supply to the charging port through the charging cable. The vehicle may include at least a charging port for AC power. The vehicle-mountable control device may further include: a determination processor; and a memory. The determination processor may be configured to determine whether or not the vehicle further includes a charging port for DC power. The memory may be configured to store first charging port information indicating a position of the charging port for DC power and second charging port information indicating a position of the charging port for AC power. The controller may be configured to cause the display device to display the position of the charging port for AC power by using the second charging port information, when the determination processor determines that the vehicle does not include the charging port for DC power.

The determination processor can determine whether or not the charging port for DC power (optional power receiver) is added to the vehicle. When the charging port for DC power is not added to the vehicle, the position of the charging port for AC power (standard power receiver) can be displayed on the display device. In addition, since the positional information (first charging port information and second charging port information) of each of the standard power receiver and the optional power receiver is stored in the memory, the work for adding the positional information (first charging port information) of the optional power receiver to the memory is unnecessary even when the optional power receiver is retrofitted to the vehicle.

The predetermined one power receiver (specified power receiver) may be the charging port for DC power. The controller may be configured to cause the display device to display the position of the charging port for DC power by using the first charging port information, when the determination processor determines that the vehicle includes the charging port for DC power.

As described above, when the charging port for DC power is added to the vehicle, the position of the charging port for DC power is displayed on the display device. Therefore, the user can be preferentially notified of the position of the charging port for DC power, when the vehicle includes both the charging port for AC power and the charging port for DC power.

The controller may be configured to cause the display device to display at which position of a vehicle body of the vehicle the specified power receiver is located. For example, the controller may be configured to cause the display device to display whether the specified power receiver is located on a right side or on a left side toward a direction of travel of the vehicle. In addition, the controller may be configured to cause the display device to display whether the specified power receiver is located in a front of or at a back of the vehicle.

With the above-described display, the user can be notified about in which orientation to park the vehicle with respect to a power feeding facility.

The controller may be configured to, when a power feeding facility for a power feeding method corresponding to the at least one power receiver included in the vehicle is present within a prescribed range around the vehicle, cause at least one of the display device and an other notification device to provide a notification of a position of the at least one power receiver corresponding to the power feeding facility within the prescribed range.

According to the above-described configuration, the user can be notified of the position of the power receiver corresponding to the power feeding facility present near the vehicle.

The controller may be configured to, when a plurality of power feeding facilities for power feeding methods corresponding to the at least one power receiver included in the vehicle are present within the prescribed range around the vehicle, cause at least one of the display device and the other notification device to provide a notification of a position of all of the at least one power receiver corresponding to the plurality of power feeding facilities within the prescribed range.

According to the above-described configuration, the user can be notified about what kind of power feeding methods the power feeding facilities present near the vehicle have.

The prescribed display device may be a meter panel of the vehicle. The controller may be configured to, when no power feeding facility for the power feeding method corresponding to the at least one power receiver included in the vehicle is present within the prescribed range around the vehicle, cause the display device to display the position of the specified power receiver. The controller may be configured to, when a power feeding facility for the power feeding method corresponding to the at least one power receiver included in the vehicle is present within the prescribed range around the vehicle, cause the display device to display the position of the at least one power receiver corresponding to the power feeding facility within the prescribed range.

According to the above-described configuration, the position of the specified power receiver is displayed on the meter panel. As a result, the user can easily check the position of the specified power receiver even during traveling of the vehicle. In addition, both when no power feeding facility for the power feeding method corresponding to the power receiver included in the vehicle is present within the prescribed range around the vehicle and when a power feeding facility for the power feeding method corresponding to the power receiver included in the vehicle is present within the prescribed range around the vehicle, appropriate display can be obtained depending on the situation.

The other notification device may include at least one of a navigation system provided in the vehicle, a display provided on a windshield of the vehicle, and a mobile device. The controller may be configured to, when a power feeding facility for the power feeding method corresponding to the at least one power receiver included in the vehicle is present within the prescribed range around the vehicle, cause the other notification device to provide a notification of the position of the at least one power receiver corresponding to the power feeding facility within the prescribed range.

The other notification device can provide a notification of the position of the power receiver in such a way that the user who is driving the vehicle can easily check the position of the power receiver. By using such notification device, it becomes easier to guide the vehicle such that the vehicle can be parked at an appropriate position in an appropriate orientation with respect to the power feeding facility. Any method may be used as a notification method. For example, a notification method by display may be used, or a notification method by sound (including voice) may be used, or a notification method by both display and sound may be used.

A vehicle according to the present disclosure includes any vehicle-mountable control device described above, and at least one power receiver configured to receive electric power supplied from an external power supply.

In such a vehicle, the above-described vehicle-mountable control device can cause a display device to suitably display a position of the power receiver even when an optional power receiver is set.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 20 is a flowchart showing a process procedure for setting a normal power receiver, which is performed in the vehicle-mountable control device applied to the vehicle shown in FIG. 19.

DETAILED DESCRIPTION

Figure 1:
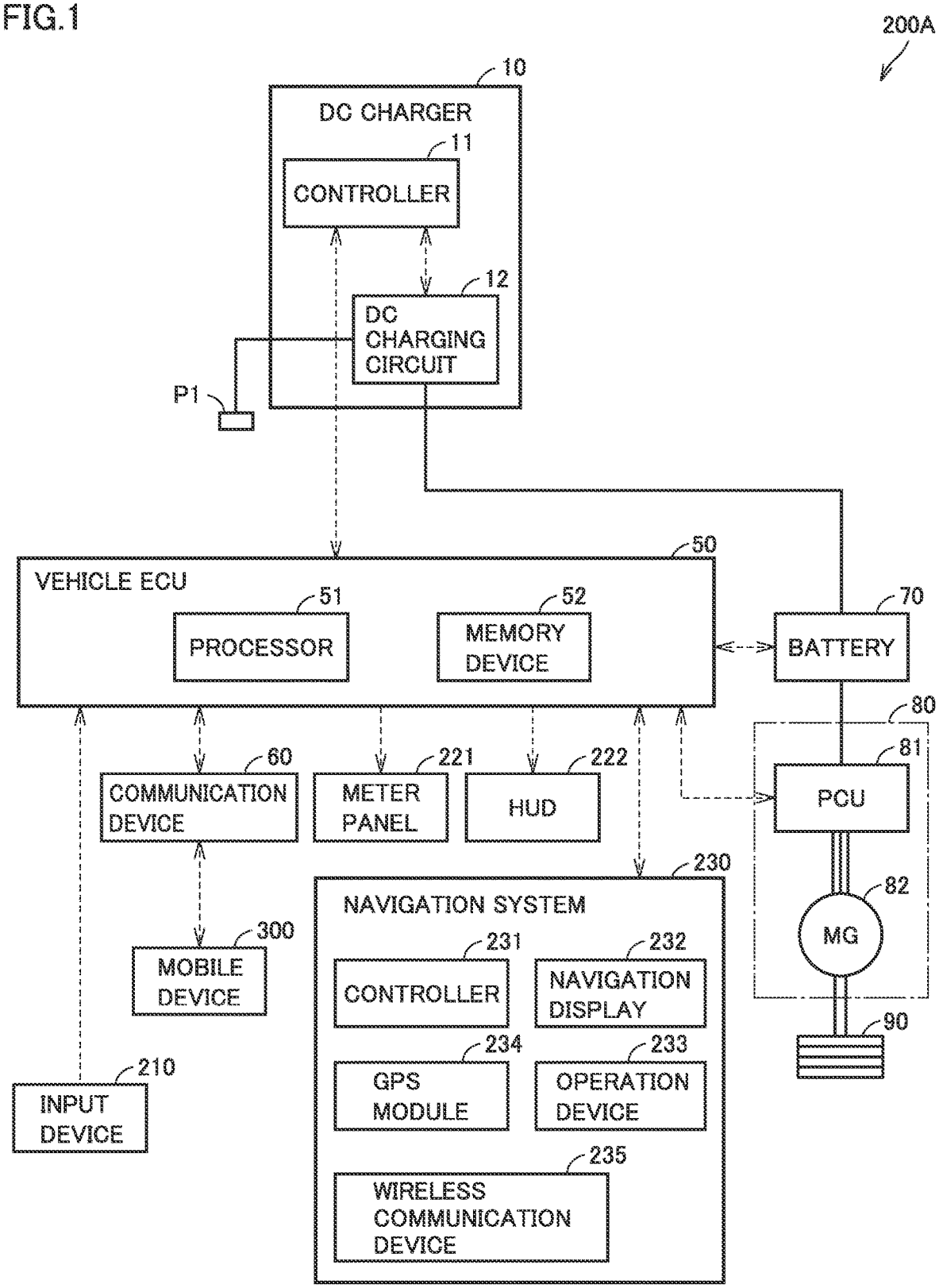
FIG. 1 shows a configuration when an AC charging port (optional power receiver) is not added in a vehicle according to an embodiment of the present disclosure.

An embodiment of the present disclosure will be described in detail with reference to the drawings, in which the same or corresponding portions are denoted by the same reference characters and description thereof will not be repeated.

In a vehicle having a vehicle-mountable control device according to the present embodiment mounted thereon, an optional power receiver is set. In the vehicle, a charging port for DC power (hereinafter, also referred to as "DC charging port") is set as a standard power receiver, and a charging port for AC power (hereinafter, also referred to as "AC charging port") is set as an optional power receiver. That is, the vehicle has the DC charging port and is configured to allow a user to select whether or not to mount the AC charging port thereon. The user can select whether or not to add the AC charging port to the vehicle, when purchasing the vehicle. The user can also retrofit the AC charging port to the vehicle after purchasing the vehicle. Description will be given below of an example in which the vehicle is a hybrid vehicle (more particularly, a plug-in hybrid vehicle). However, the applicable range of the vehicle-mountable control device is not limited to the hybrid vehicle and the vehicle-mountable control device may be applied to an electric vehicle not having an engine mounted thereon. Hereinafter, an electronic control unit will be referred to as "ECU".

Figure 2:
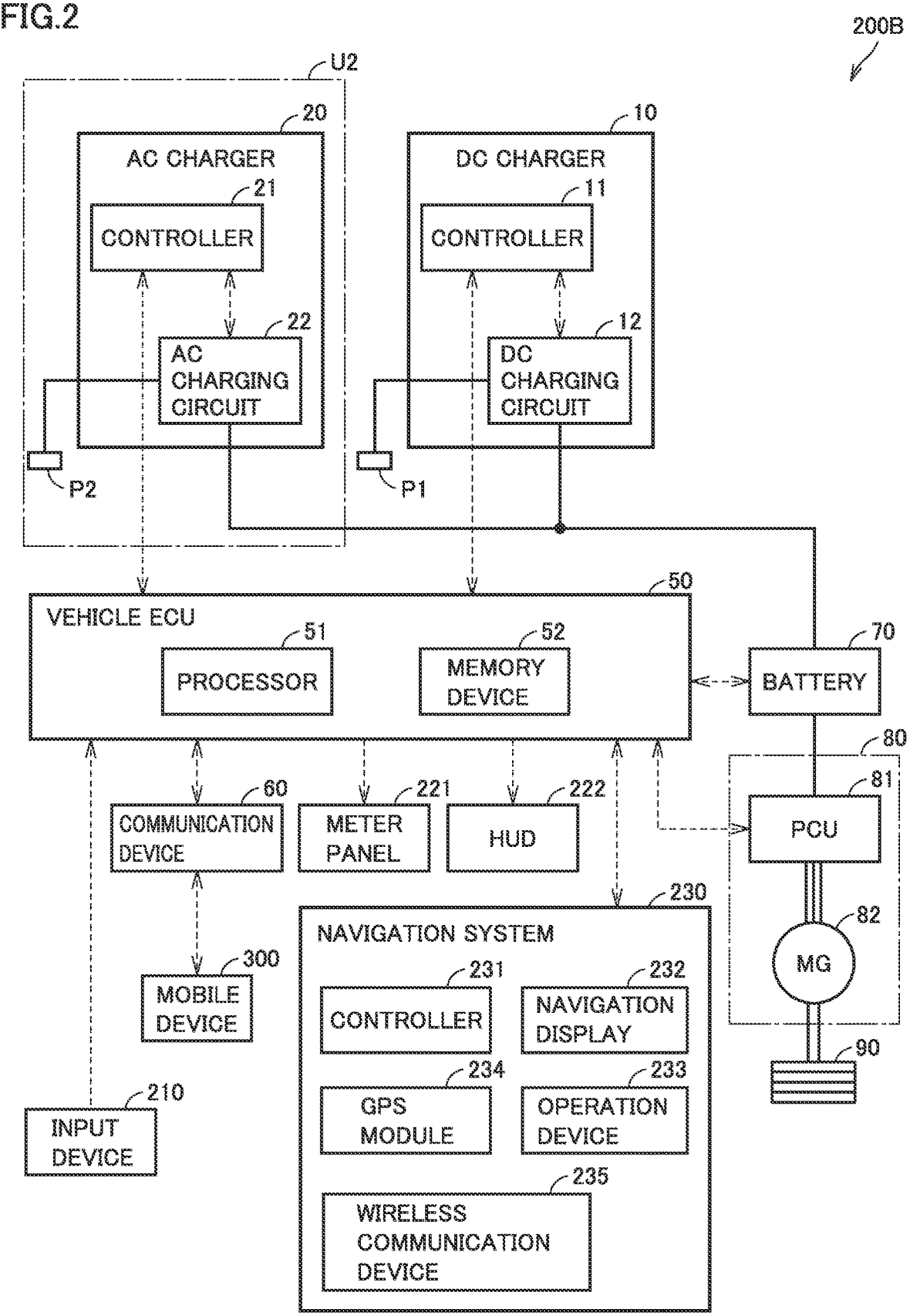
FIG. 2 shows a configuration when the AC charging port (optional power receiver) is added in the vehicle according to the embodiment of the present disclosure.

FIG. 1 shows a configuration when the AC charging port (optional power receiver) is not added in the vehicle according to the present embodiment. FIG. 2 shows a configuration when the AC charging port (optional power receiver) is added in the vehicle according to the present embodiment. FIGS. 1 and 2 mainly show a charging path of a vehicle-mounted battery in the vehicle. Hereinafter, the vehicle to which the AC charging port is not added will be referred to as "vehicle 200A" and the vehicle to which the AC charging port is added will be referred to as "vehicle 200B".

Referring to FIG. 1, vehicle 200A includes a DC charger 10, a DC inlet P1, a vehicle ECU 50, a communication device 60, a battery 70, a travel driving device 80, a driving wheel 90, an input device 210, a meter panel 221, a head up display (hereinafter, referred to as "HUD") 222, and a navigation system 230. Travel driving device 80 includes a PCU (Power Control Unit) 81 and an MG (Motor Generator) 82, and is configured to cause vehicle 200A to travel using electric power stored in battery 70. DC charger 10 and travel driving device 80 are controlled by vehicle ECU 50. Vehicle ECU 50 according to the present embodiment corresponds to one example of "vehicle-mountable control device" according to the present disclosure.

Vehicle ECU 50 includes a not-shown input/output port and a not-shown communication port, in addition to a processor 51 and a memory device 52. A CPU (Central Processing Unit) can, for example, be used as processor 51. Memory device 52 includes a RAM (Random Access Memory) configured to temporarily store data, and a storage (e.g., a ROM (Read Only Memory) and a rewritable non-volatile memory) configured to save various types of information. In addition to programs used in various types of control, various parameters used in the programs and various types of information displayed on a display device (e.g., indicators M11 and M12 displayed on meter panel 221) are also prestored in the storage. Processor 51 executes the programs stored in memory device 52 and the various types of control are thereby performed. Vehicle ECU 50 according to the present embodiment includes "controller" and "determination processor" according to the present disclosure. "Controller" and "determination processor" are implemented by, for example, processor 51 and the programs executed by processor 51. The various types of control can be processed not only by software but also by dedicated hardware (electronic circuit).

Communication device 60 is configured to wirelessly communicate with a prescribed mobile device (e.g., a mobile device 300 present in a vehicle cabin of vehicle 200A). Vehicle ECU 50 can wirelessly communicate with mobile device 300 through communication device 60. Examples of mobile device 300 include an information terminal having built therein a small computer such as a smartphone, a smart watch, a laptop, a tablet terminal, and a portable game console.

Input device 210 is a device configured to accept an input from the user. Input device 210 is operated by the user and outputs a signal corresponding to the operation by the user to vehicle ECU 50. A communication method may be wired or wireless. In addition to various switches (e.g., a push button switch), a keyboard, a mouse, a touch panel or the like can be used as input device 210. In the present embodiment, input device 210 includes a power switch PS described below, and operation switches S1 and S2 (see FIG. 5).

Although not shown, vehicle 200A is provided with various sensors (e.g., a vehicle speed sensor, a fuel gauge, an odometer, an accelerator opening degree sensor, an atmospheric pressure sensor, and an outdoor air temperature sensor) configured to detect a state of vehicle 200A and output the state of vehicle 200A to vehicle ECU 50. Vehicle ECU 50 is configured to determine a state (e.g., a travel speed of the vehicle, an outdoor air temperature, a remaining amount of fuel of an engine, an SOC (State Of Charge) of battery 70, a travel distance, a fuel consumption, and an electric mileage) of vehicle 200A based on values output from these sensors and a value output from a monitoring device of battery 70 described below. The state of vehicle 200A determined by vehicle ECU 50 is, for example, displayed on meter panel 221. Meter panel 221 displays, for example, a main display, a multi information display, a warning lamp and a display lamp, and a clock. Basic information about traveling is displayed on the main display. Various types of information (e.g., a state of operation of the vehicle system as well as history information about the fuel consumption and the electric mileage) for convenient use of the vehicle are displayed on the multi information display. Meter panel 221 is controlled by vehicle ECU 50.

HUD 222 is a display provided on a windshield of vehicle 200A. HUD 222 is controlled by vehicle ECU 50. The state of vehicle 200A is, for example, displayed on HUD 222.

Navigation system 230 includes a controller 231, a display (hereinafter, referred to as "navigation display") 232, an operation device 233, a GPS (Global Positioning System) module 234, and a wireless communication device 235. Navigation system 230 is configured to perform route search for finding an optimum route (e.g., a shortest route) from a current position of vehicle 200A to a destination, and display the optimum route found by the route search on a map. Navigation system 230 may have a speaker function and be configured to guide vehicle 200A by sound (including voice).

Controller 231 basically has the same hardware configuration as that of above-described vehicle ECU 50. That is, controller 231 also includes a processor and a memory device (both are not shown). However, specifications of controller 231 such as a processing capacity of the processor or a capacity of the memory device of controller 231 may be different from those of above-described vehicle ECU 50. A control program and a map database are, for example, stored in the memory device of controller 231. The map database includes information (e.g., a position and a power feeding method) about a power feeding facility. The information about a power feeding facility may be added to the map database in accordance with an input from the user. Navigation display 232 is configured to display the information (e.g., the map and the optimum route) in accordance with an instruction from controller 231. Operation device 233 basically has the same function as that of above-described input device 210, and a push button, a touch panel, and any other input device can, for example, be used. By operating operation device 233, the user can input the destination in the above-described route search and any other information to controller 231.

Controller 231 is configured to cause navigation display 232 to display the map around the vehicle. Controller 231 is also configured to execute the control program based on, for example, an input from the user to thereby perform the above-described route search, and cause navigation display 232 to display a search result. Controller 231 can also cause navigation display 232 to display charging-related information in accordance with a request from the user. By operating operation device 233, the user can perform switching between a screen indicating the map around the vehicle (hereinafter, also referred to as "surrounding map screen") and a screen indicating the charging-related information (hereinafter, also referred to as "charging-related screen").

GPS module 234 includes a reception device configured to receive a signal (hereinafter, referred to as "GPS signal") from a GPS satellite. Controller 231 can identify the current position of vehicle 200A using the GPS signal. Any method may be used as a method for detecting the current position of vehicle 200A. For example, the current position of vehicle 200A may be calculated using an output from a gyrosensor (not shown) configured to detect rotation (change in orientation) of vehicle 200A, in addition to the GPS signal.

Wireless communication device 235 is a communication device configured to wirelessly communicate with the outside. Controller 231 can wirelessly communicate with the outside through wireless communication device 235 and can receive various types of information from a data center (not shown) through a communication network, for example. More specifically, the latest map information is transmitted from the data center to navigation system 230 as needed, and controller 231 updates the above-described map database using the received map information.

Vehicle ECU 50 and navigation system 230 are connected to communicate with each other. Vehicle ECU 50 can obtain the information (e.g., the map information and the current position of vehicle 200A) from navigation system 230. Vehicle ECU 50 may cause at least one of meter panel 221 and HUD 222 to display the information obtained from navigation system 230.

The operation devices (e.g., input device 210 and operation device 233 of navigation system 230) operated by the user are placed, for example, at a position where the user sitting in a driver's seat in the vehicle cabin of vehicle 200A can operate the operation devices. The display devices (e.g., meter panel 221, HUD 222, and navigation display 232 of navigation system 230) configured to display the information to the user are placed, for example, at a position where the user sitting in the driver's seat in the vehicle cabin of vehicle 200A can visually recognize the display devices. One example of arrangement of the operation devices and the display devices in the vehicle cabin (particularly, the vicinity of the driver's seat) of vehicle 200A will be described below (see FIG. 5).

DC inlet P1 is a charging port corresponding to a power feeding facility for the DC method (e.g., a DC power feeding stand such as a quick charger). DC inlet P1 and the DC power feeding stand (e.g., a DC power feeding stand 410 shown in FIG. 4 below) according to the present embodiment correspond to one example of "charging port for DC power" and "external power supply" according to the present disclosure, respectively. When a connector of a charging cable connected to the DC power feeding stand is connected to DC inlet P1, DC inlet P1 can receive DC power supplied from the DC power feeding stand through the charging cable. The DC power supplied to DC inlet P1 is input to DC charger 10.

DC charger 10 is a vehicle-mounted charger corresponding to the DC method (direct current method), and includes a controller 11 and a DC charging circuit 12. Controller 11 basically has the same hardware configuration as that of above-described vehicle ECU 50. That is, controller 11 also includes a processor and a memory device (both are not shown). DC charging circuit 12 includes, for example, a filter circuit, and various sensors configured to detect a state (e.g., a temperature, a current and a voltage) of each portion (all are not shown). A result of detection by the sensors indicating the state of each portion in DC charging circuit 12 is output to controller 11, and then, is transmitted from controller 11 to vehicle ECU 50.

When vehicle 200A is parked in a prescribed orientation in the vicinity of the DC power feeding stand and the DC power feeding stand and DC inlet P1 of vehicle 200A are connected to each other through the charging cable, electric power can be supplied from the DC power feeding stand to vehicle 200A. When a prescribed charging start condition is satisfied in such a state, vehicle ECU 50 charges battery 70 with the electric power supplied from the DC power feeding stand. More specifically, the DC power supplied from the DC power feeding stand to DC inlet P1 through the charging cable is input to DC charging circuit 12. Controller 11 is configured to receive an instruction (control signal) from vehicle ECU 50 and control DC charging circuit 12 in accordance with the instruction. During charging of battery 70, the electric power of the DC power feeding stand is supplied to battery 70 through DC charging circuit 12.

Battery 70 is a driving battery configured to store electric power for electrically powered traveling, and is charging-controlled by vehicle ECU 50. Although not shown, vehicle 200A further includes an engine (internal combustion engine). Vehicle 200A is a hybrid vehicle that can travel using both the electric power stored in battery 70 and an output of the engine (not shown). The kinetic energy generated by the engine is split by a power split device (not shown), and is used for driving of driving wheel 90 and used for power generation in a not-shown MG.

Battery 70 includes a secondary battery such as a lithium ion battery or a nickel-metal hydride battery, a charging relay controlled to be turned on and off by vehicle ECU 50, an SMR (system main relay) controlled to be turned on and off by vehicle ECU 50, and a monitoring device configured to monitor a state of battery 70 (all are not shown). The monitoring device includes various sensors configured to detect the state (e.g., a temperature, a current and a voltage) of battery 70, and outputs a result of detection to vehicle ECU 50. The charging relay is turned on when battery 70 is charged by the external power supply (power supply external to the vehicle). The SMR is turned on when the vehicle travels using the electric power of battery 70. Vehicle ECU 50 obtains the state (e.g., the SOC) of battery 70 based on the output from the monitoring device (detection values of various sensors).

Battery 70 supplies electric power for driving wheel 90 by MG 82 to PCU 81. MG 82 is a rotating electric machine and is, for example, a three-phase AC motor generator. MG 82 is driven by PCU 81 and rotates driving wheel 90. MG 82 can also perform regenerative power generation during braking of vehicle 200A.

PCU 81 is configured to include a controller including a processor (e.g., a CPU), an inverter and a converter (all are not shown). The controller of PCU 81 is configured to receive an instruction (control signal) from vehicle ECU 50 and control the inverter and the converter of PCU 81 in accordance with the instruction. During power running driving of MG 82, PCU 81 converts the electric power stored in battery 70 to AC power and supplies the AC power to MG 82. During power generation by MG 82, PCU 81 rectifies the generated electric power and supplies the rectified electric power to battery 70.

Next, a configuration of vehicle 200B will be described with reference to FIG. 2. However, description of the features common to vehicles 200A and 200B will not be repeated. Referring to FIG. 2, vehicle 200B is configured such that an optional module U2 is added to vehicle 200A (FIG. 1). Optional module U2 includes an AC inlet P2 and an AC charger 20.

AC inlet P2 is a charging port corresponding to a power feeding facility for the AC method (e.g., an AC power feeding stand such as a normal charger). AC inlet P2 and the AC power feeding stand (e.g., an AC power feeding stand 420 shown in FIG. 3 below) according to the present embodiment correspond to one example of "charging port for AC power" and "external power supply" according to the present disclosure, respectively. When a connector of a charging cable connected to the AC power feeding stand is connected to AC inlet P2, AC inlet P2 can receive AC power supplied from the AC power feeding stand through the charging cable. The AC power supplied to AC inlet P2 is input to AC charger 20.

AC charger 20 is a vehicle-mounted charger corresponding to the AC method (alternating current method), and includes a controller 21 and an AC charging circuit 22. Controller 21 basically has the same hardware configuration as that of above-described vehicle ECU 50. That is, controller 21 also includes a processor and a memory device (both are not shown). AC charging circuit 22 includes, for example, a filter circuit, a rectifier circuit, and various sensors configured to detect a state (e.g., a temperature, a current and a voltage) of each portion (all are not shown). A result of detection by the sensors indicating the state of each portion in AC charging circuit 22 is output to controller 21, and then, is transmitted from controller 21 to vehicle ECU 50.

When vehicle 200B is parked in a prescribed orientation in the vicinity of the AC power feeding stand and the AC power feeding stand and AC inlet P2 of vehicle 200B are connected to each other through the charging cable, electric power can be supplied from the AC power feeding stand to vehicle 200B. When a prescribed charging start condition is satisfied in such a state, vehicle ECU 50 charges battery 70 with the electric power supplied from the AC power feeding stand. More specifically, the AC power supplied from the AC power feeding stand to AC inlet P2 through the charging cable is input to AC charging circuit 22. Controller 21 is configured to receive an instruction (control signal) from vehicle ECU 50 and control AC charging circuit 22 in accordance with the instruction. During charging of battery 70, the electric power of the AC power feeding stand is supplied to battery 70 through AC charging circuit 22.

Figure 3:
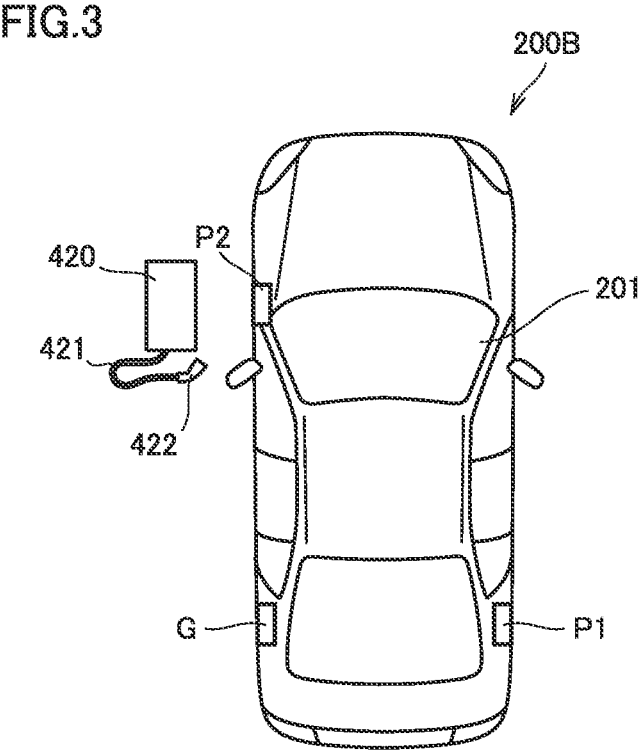
FIG. 3 shows a state when the vehicle shown in FIG. 2 is supplied with electric power from an AC power feeding stand.

FIG. 3 shows a state of vehicle 200B when vehicle 200B is supplied with electric power from the AC power feeding stand. Referring to FIG. 3, DC inlet P1 and AC inlet P2 in vehicle 200B are provided at positions predetermined for each vehicle type. In the present embodiment, DC inlet P1 is placed on the right side (more particularly, on the right side in a vehicle back part) toward a direction of travel of vehicle 200B. AC inlet P2 is placed on the left side (more particularly, on the left side in a vehicle front part) toward the direction of travel of vehicle 200B. Furthermore, a refueling port G through which a fuel tank (more particularly, a tank configured to store fuel to be supplied to the engine) is replenished with fuel is placed on the left side in the vehicle back part of vehicle 200B. In the present embodiment, positional information of each of DC inlet P1 and AC inlet P2 is prestored in the storage of memory device 52 of vehicle ECU 50. Hereinafter, the right side toward the direction of travel of the vehicle may be simply referred to as "right side of the vehicle", and the left side toward the direction of travel of the vehicle may be simply referred to as "left side of the vehicle".

In FIG. 3, AC power feeding stand 420 includes a charging cable 421. When vehicle 200B is supplied with electric power from AC power feeding stand 420, vehicle 200B is parked such that AC power feeding stand 420 is located on the left side (more particularly, in the vicinity of AC inlet P2) of vehicle 200B as shown in FIG. 3. When a connector 422 of charging cable 421 of AC power feeding stand 420 is connected to AC inlet P2, the electric power can be supplied from AC power feeding stand 420 to vehicle 200B. When vehicle 200B is parked in an orientation opposite to the orientation shown in FIG. 3, the right side of vehicle 200B faces AC power feeding stand 420, and thus, it is difficult to connect charging cable 421 to AC inlet P2.

Figure 4:
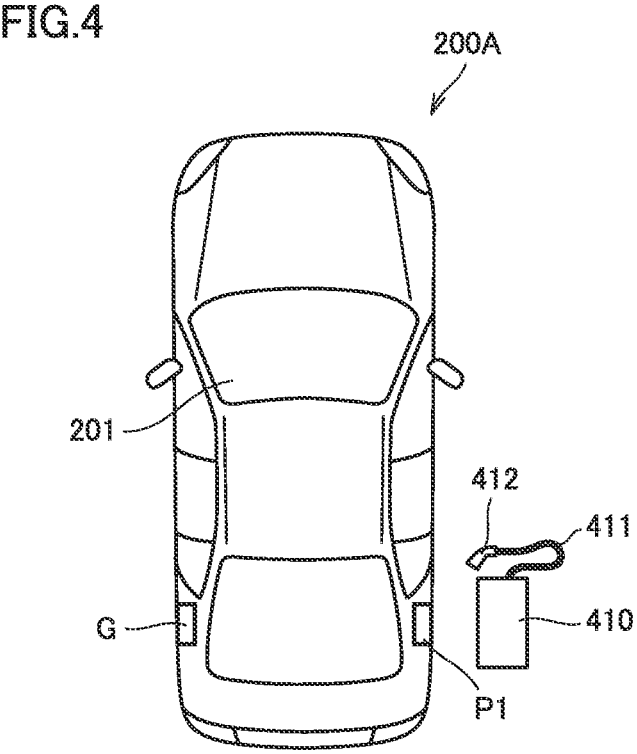
FIG. 4 shows a state when the vehicle shown in FIG. 1 is supplied with electric power from a DC power feeding stand.

FIG. 4 shows a state of vehicle 200A when vehicle 200A is supplied with electric power from the DC power feeding stand. Referring to FIG. 4, the positions of DC inlet P1 and refueling port G in vehicle 200A are the same as the positions of DC inlet P1 and refueling port G in vehicle 200B, respectively. Vehicle 200A does not include AC inlet P2. However, in vehicle 200A as well, positional information of each of DC inlet P1 and AC inlet P2 is prestored in the storage of memory device 52 of vehicle ECU 50. That is, vehicle 200A is equipped with the positional information of all mountable inlets as standard, and software common to vehicle 200A and vehicle 200B is used. With such a configuration, the software change work (including addition of information) when optional module U2 is added to vehicle 200A can be omitted.

In FIG. 4, DC power feeding stand 410 includes a charging cable 411. When vehicle 200A is supplied with electric power from DC power feeding stand 410, vehicle 200A is parked such that DC power feeding stand 410 is located on the right side (more particularly, in the vicinity of DC inlet P1) of vehicle 200A as shown in FIG. 4. When a connector 412 of charging cable 411 of DC power feeding stand 410 is connected to DC inlet P1, the electric power can be supplied from DC power feeding stand 410 to vehicle 200A. When vehicle 200A is parked in an orientation opposite to the orientation shown in FIG. 4, the left side of vehicle 200A faces DC power feeding stand 410, and thus, it is difficult to connect charging cable 411 to DC inlet P1.

Figure 5:
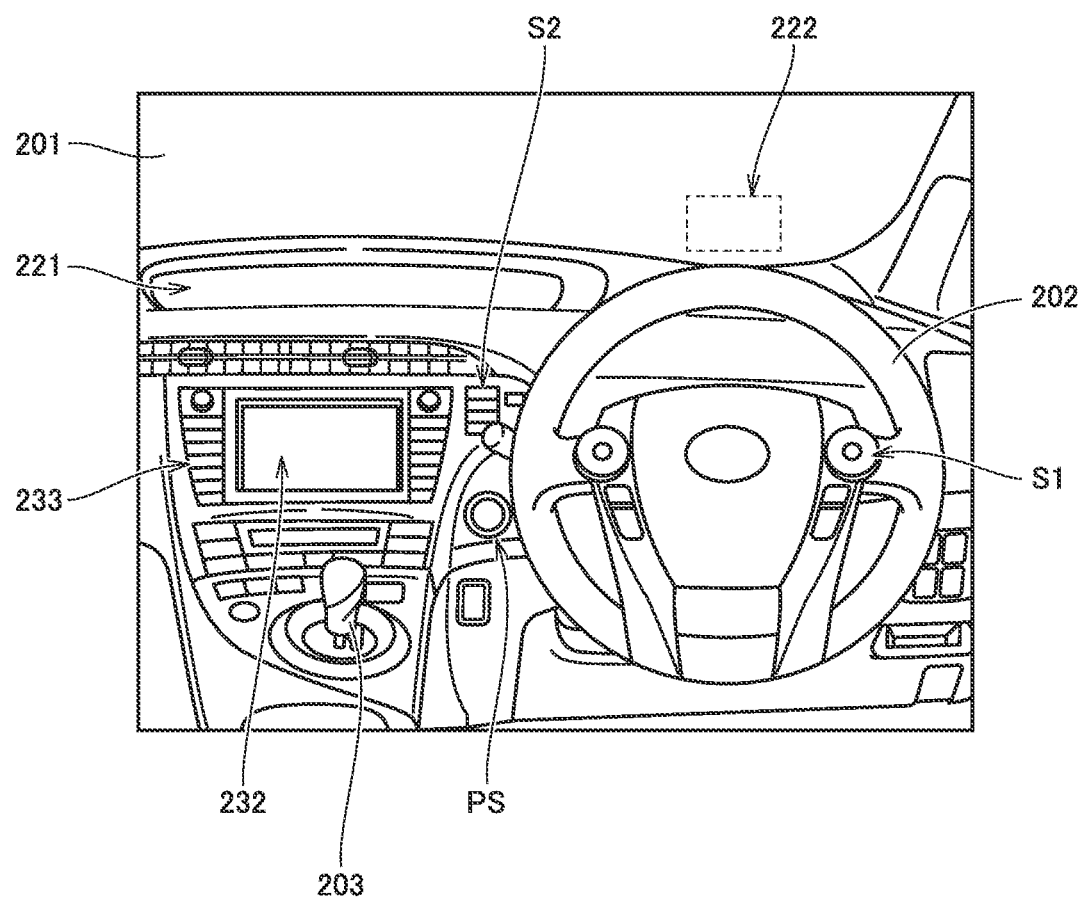
FIG. 5 shows a vehicle cabin (particularly, the vicinity of a driver's seat) of the vehicle according to the embodiment of the present disclosure.

FIG. 5 shows the vehicle cabin (particularly, the vicinity of the driver's seat) of the vehicle (vehicle 200A, 200B) according to the present embodiment.

Referring to FIG. 5 together with FIGS. 1 to 4, the vehicle according to the present embodiment includes a windshield 201, a steering wheel 202 and a shift lever 203. Meter panel 221 as well as navigation display 232 and operation device 233 of navigation system 230 are provided on an instrument panel in the vehicle cabin, and HUD 222 is provided on windshield 201. A main body of HUD 222 is arranged in the instrument panel. Meter panel 221 is located in the vicinity of windshield 201, and navigation display 232 and operation device 233 are located on the back side of shift lever 203 when viewed from the driver's seat.

Various switches included in input device 210 are also provided in the vehicle cabin. For example, power switch PS operated, for example, when driving of the vehicle is started or ended is provided in the vicinity of steering wheel 202. For example, when power switch PS is pressed, with a brake pedal (not shown) being depressed, in the case where the vehicle system is in a stop state, the vehicle system (and further, vehicle ECU 50) starts up. Then, the SMR of battery 70 is turned on by started vehicle ECU 50, and thus, electric power is supplied to travel driving device 80 and the vehicle is ready to travel. In addition, when the vehicle system is in an operating state, a driver of the vehicle can stop the vehicle system (and further, vehicle ECU 50) by stopping the vehicle, putting on a parking brake (not shown) and bringing the shift position into P (parking) with shift lever 203, and then, pressing power switch PS.

Steering wheel 202 is also provided with operation switch S1 for switching display of meter panel 221. In addition, operation switch S2 for switching on/off and display of HUD 222 is provided in the vicinity of navigation display 232.

Figure 6:
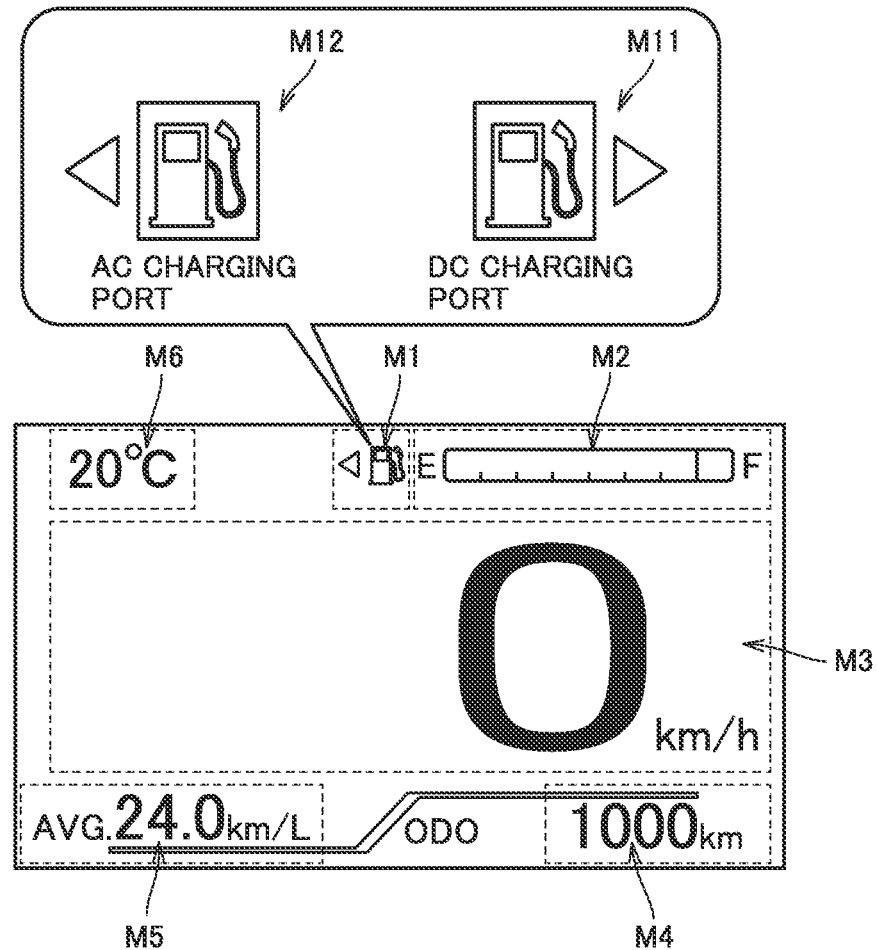
FIG. 6 shows one example of a main display of a meter panel.

The vehicle (vehicle 200A, 200B) according to the present embodiment is configured to cause meter panel 221 to display the position of the charging port (DC inlet P1, AC inlet P2) when the vehicle system is in the operating state (e.g., during traveling). FIG. 6 shows one example of a main display of meter panel 221. Referring to FIG. 6, the main display includes display regions M1 to M6.

Display region M1 displays at least one of indicators M11 and M12 indicating the positions of the charging ports. Indicator M11 indicates that the charging port is located on the right side of the vehicle. Indicator M12 indicates that the charging port is located on the left side of the vehicle. In the present embodiment, the position of DC inlet P1 (DC charging port) is indicated by indicator M11, and the position of AC inlet P2 (AC charging port) is indicated by indicator M12. Indicators M11 and M12 according to the present embodiment correspond to one example of "first charging port information" and "second charging port information" according to the present disclosure, respectively.

Display region M2 displays a remaining amount (e.g., the SOC) of battery 70 or a remaining amount of fuel. Display region M3 displays a travel speed of the vehicle. Display region M4 displays a travel distance of the vehicle. Display region M5 displays an average fuel consumption or an average electric mileage. Display region M6 displays an outdoor air temperature.

In the vehicle according to the present embodiment, control described below is performed on display of above-described display region M1. Therefore, both in vehicle 200A in which optional module U2 (including AC inlet P2) is not added and in vehicle 200B in which optional module U2 is added, vehicle ECU 50 can cause meter panel 221 (more particularly, display region M1) to suitably display the position of the charging port.

When the vehicle includes a plurality of charging ports, vehicle ECU 50 causes display region M1 of meter panel 221 to display a position of a predetermined one charging port (specified power receiver) of the plurality of charging ports. In the present embodiment, AC inlet P2 is set as the specified power receiver. That is, in vehicle 200A including only one charging port (more particularly, DC inlet P1 that is the standard power receiver), indicator M11 indicating the position of DC inlet P1 is displayed on display region M1, and in vehicle 200B including two charging ports (more particularly, DC inlet P1 and AC inlet P2), indicator M12 indicating the position of AC inlet P2 (specified power receiver) is displayed on display region M1. However, when a power feeding facility for a power feeding method corresponding to the power receiver included in the vehicle is present within a prescribed range around the vehicle (hereinafter, also referred to as "prescribed peripheral range"), the position of the charging port corresponding to the power feeding facility is displayed on display region M1 of meter panel 221.

Hereinafter, the power receiver whose position is displayed on the prescribed display device (in the present embodiment, meter panel 221) when the power feeding facility for the power feeding method corresponding to the power receiver included in the vehicle is not present within the prescribed peripheral range will be referred to as "normal power receiver".

Figure 7:
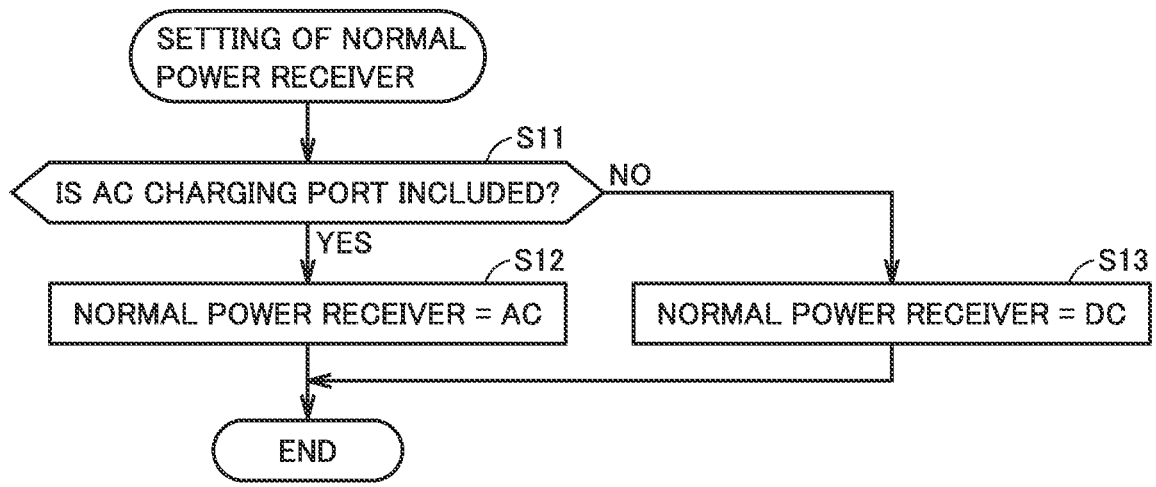
FIG. 7 is a flowchart showing a process procedure for setting a normal power receiver, which is performed by a vehicle-mountable control device according to the embodiment of the present disclosure.

FIG. 7 is a flowchart showing a process procedure for setting the normal power receiver, which is performed by the vehicle-mountable control device (vehicle ECU 50) according to the present embodiment. The process shown in this flowchart is performed at the time of, for example, initial startup of vehicle ECU 50. Regardless of whether the vehicle is vehicle 200A or 200B, the process in FIG. 7 is performed by started vehicle ECU 50 at the time of initial startup of vehicle ECU 50. When optional module U2 is retrofitted to vehicle 200A, vehicle 200A changes into vehicle 200B as a result of the retrofitting of optional module U2. In this case, the process in FIG. 7 may be performed again at the time of initial startup of vehicle ECU 50 in vehicle 200B. Alternatively, in order that the user, a dealer or a manufacturer can perform the process in FIG. 7 at any timing, the user may operate input device 210 and instruct vehicle ECU 50 to perform the process in FIG. 7.

Referring to FIG. 7, in step (hereinafter, also simply denoted as "S") 11, vehicle ECU 50 determines whether or not the vehicle includes AC inlet P2 (AC charging port). Vehicle ECU 50 requests a response signal from controller 21, for example. When the response signal is not returned, vehicle ECU 50 determines that optional module U2 (and further, AC inlet P2) is not present (NO in S11). When the response signal is returned, vehicle ECU 50 determines that optional module U2 (and further, AC inlet P2) is present (YES in S11).

When it is determined in S11 that the vehicle includes AC inlet P2 (YES), vehicle ECU 50 sets AC inlet P2 (specified power receiver) as the normal power receiver (S12). On the other hand, when it is determined in S11 that the vehicle does not include AC inlet P2 (NO), vehicle ECU 50 sets DC inlet P1 as the normal power receiver (S13). Then, the set normal power receiver is stored in memory device 52.

Figure 8:
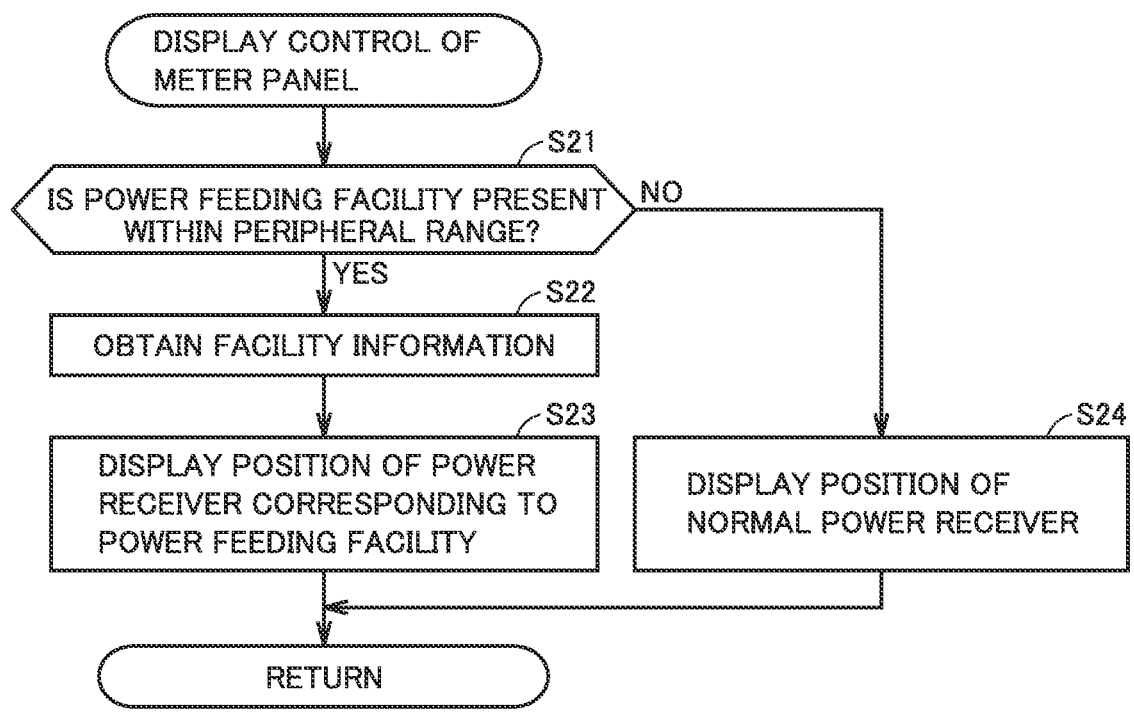
FIG. 8 is a flowchart showing a process procedure for display control of the meter panel, which is performed by the vehicle-mountable control device according to the embodiment of the present disclosure.

FIG. 8 is a flowchart showing a process procedure for display control of meter panel 221 (particularly, control about display of display region M1), which is performed by the vehicle-mountable control device (vehicle ECU 50) according to the present embodiment. The process shown in this flowchart is called from a main routine (not shown) at every prescribed control cycle and is repeatedly performed.

Referring to FIG. 8, in S21, vehicle ECU 50 determines whether or not the power feeding facility (more particularly, the power feeding facility for the power feeding method corresponding to the power receiver included in the vehicle) is present within the prescribed peripheral range. Hereinafter, the power feeding facility for the power feeding method corresponding to the power receiver included in the vehicle will be referred to as "corresponding power feeding facility". In vehicle 200A (FIG. 1), the power feeding facility for the DC method is the corresponding power feeding facility, and in vehicle 200B (FIG. 2), the power feeding facility corresponding to at least one of the DC method and the AC method is the corresponding power feeding facility. Using, for example, a result of determination in S11 in FIG. 7, vehicle ECU 50 can recognize that the vehicle includes only DC inlet P1 (i.e., the vehicle is vehicle 200A) when determination of NO is made in S11, and can recognize that the vehicle includes both DC inlet P1 and AC inlet P2 (i.e., the vehicle is vehicle 200B) when determination of YES is made in S11. The prescribed peripheral range is a peripheral range based on the current position of the vehicle and the size of the range can be arbitrarily set. The prescribed peripheral range may be a fixed range, or may be variable depending on the situation of the vehicle. In the present embodiment, the prescribed peripheral range is set in accordance with display of navigation display 232.

Figure 9:
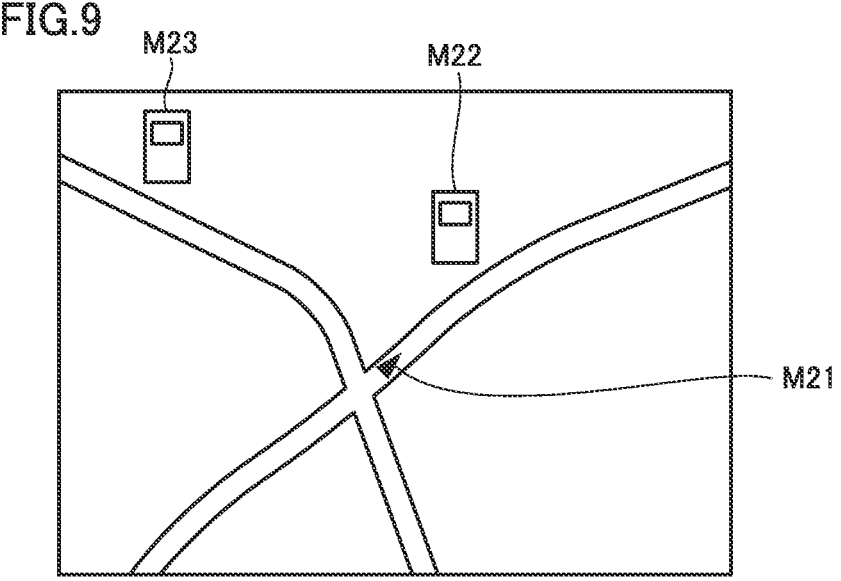
FIG. 9 shows one example of a surrounding map screen of a navigation display in the embodiment of the present disclosure.

FIG. 9 shows one example of a surrounding map screen of navigation display 232. Referring to FIG. 9, a marker M21 indicates the current position of the vehicle. Each of markers M22 and M23 indicates the corresponding power feeding facility. That is, in vehicle 200A (FIG. 1), only the power feeding facility for the DC method is displayed in the surrounding map screen, and in vehicle 200B (FIG. 2), the power feeding facility corresponding to at least one of the DC method and the AC method is displayed in the surrounding map screen. In the surrounding map screen shown in FIG. 9, the power feeding facility indicated by marker M22 is located at a position closer to the current position of the vehicle than the power feeding facility indicated by marker M23. When the surrounding map screen of navigation display 232 is turned on by operation device 233, the map around the current position of the vehicle is displayed on navigation display 232. In the present embodiment, a range displayed on navigation display 232 is the prescribed peripheral range used in S21. That is, in the example shown in FIG. 9, the power feeding facilities indicated by markers M22 and M23 are present within the prescribed peripheral range. When the user operates operation device 233 and a scale of the map displayed on navigation display 232 is thereby changed, the above-described prescribed peripheral range may be changed in accordance therewith.

Referring again to FIG. 8, when it is determined in S21 that the corresponding power feeding facility is present within the prescribed peripheral range (YES), vehicle ECU 50 obtains, from navigation system 230, information (e.g., the power feeding method) about the corresponding power feeding facility present within the prescribed peripheral range in S22. When a plurality of corresponding power feeding facilities are present within the prescribed peripheral range, vehicle ECU 50 obtains, from navigation system 230, information about the corresponding power feeding facility closest to the vehicle (in the example in FIG. 9, the corresponding power feeding facility indicated by marker M22), for example.

Furthermore, in S23, based on the information obtained in S22 above, vehicle ECU 50 causes display region M1 (FIG. 6) of meter panel 221 to display the position of the charging port (power receiver) corresponding to the corresponding power feeding facility closest to the vehicle, for example. More specifically, when the corresponding power feeding facility closest to vehicle 200A or 200B is the power feeding facility for the DC method, indicator M11 indicating the position of DC inlet P1 is displayed on display region M1. When the corresponding power feeding facility closest to vehicle 200B is the power feeding facility for the AC method, indicator M12 indicating the position of AC inlet P2 is displayed on display region M1. When the corresponding power feeding facility closest to vehicle 200B is the power feeding facility corresponding to both the AC method and the DC method, both indicators M11 and M12 are displayed on display region M1. After S23, the process is returned to the main routine.

On the other hand, when it is determined in S21 that the corresponding power feeding facility is not present within the prescribed peripheral range (NO), vehicle ECU 50 causes display region M1 (FIG. 6) of meter panel 221 to display the position of the normal power receiver set in S12 or S13 in FIG. 7 in S24. More specifically, when DC inlet P1 is set as the normal power receiver in S13 in FIG. 7, indicator M11 is displayed on display region M1, and when AC inlet P2 is set as the normal power receiver in S12 in FIG. 7, indicator M12 is displayed on display region M1. After S24, the process is returned to the main routine.

Figure 10:
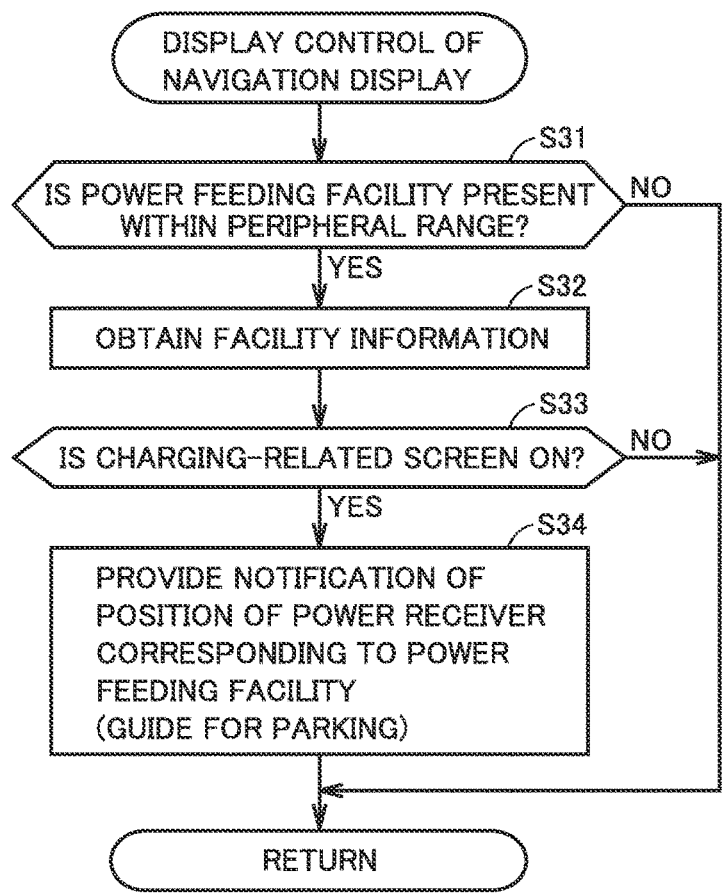
FIG. 10 is a flowchart showing a process procedure for display control of the navigation display, which is performed by the vehicle-mountable control device according to the embodiment of the present disclosure.

FIG. 10 is a flowchart showing a process procedure for display control of navigation display 232, which is performed by the vehicle-mountable control device (vehicle ECU 50) according to the present embodiment. The process shown in this flowchart is called from the main routine (not shown) at every prescribed control cycle and is repeatedly performed.

Referring to FIG. 10, in S31, vehicle ECU 50 determines whether or not the corresponding power feeding facility is present within the prescribed peripheral range. When it is determined in S31 that the corresponding power feeding facility is not present within the prescribed peripheral range (NO), the process is returned to the main routine. On the other hand, when it is determined in S31 that the corresponding power feeding facility is present within the prescribed peripheral range (YES), vehicle ECU 50 obtains, from navigation system 230, information (e.g., the power feeding method) about the corresponding power feeding facility present within the prescribed peripheral range in S32. Since S31 and S32 are the same as S21 and S22 in FIG. 8, respectively, description will not be repeated.

After S32, vehicle ECU 50 determines in S33 whether or not the charging-related screen of navigation display 232 is on. For example, when the surrounding map screen is being displayed on navigation display 232, it is determined that the charging-related screen is not on (NO in S33). Thereafter, when the user operates operation device 233 and display of navigation display 232 is thereby switched from the surrounding map screen to the charging-related screen, it is determined that the charging-related screen is on (YES in S33). When it is determined in S33 that the charging-related screen is not on (NO), the process is returned to the main routine.

On the other hand, when it is determined in S33 that the charging-related screen of navigation display 232 is on (YES), vehicle ECU 50 causes navigation display 232 to display the position of the charging port (power receiver) corresponding to the corresponding power feeding facility closest to the vehicle, for example, in S34 based on the information obtained in S32. With such display, navigation display 232 notifies the user of the position of the charging port corresponding to the corresponding power feeding facility closest to the vehicle, and guides the vehicle such that the vehicle can be parked at an appropriate position in an appropriate orientation with respect to the power feeding facility.

Figure 11:
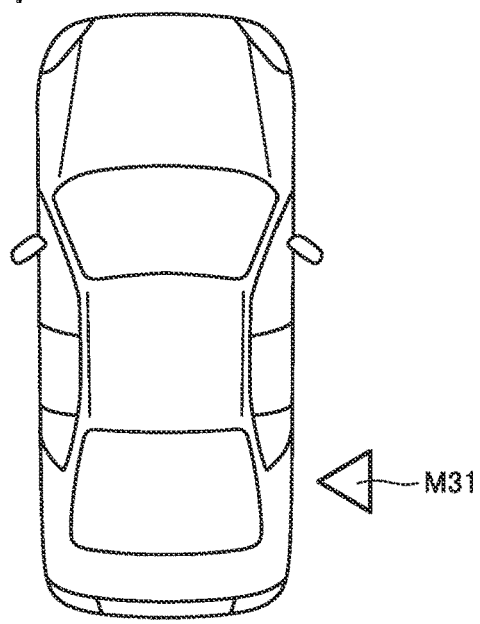
FIG. 11 shows a first example of a charging-related screen of the navigation display in the embodiment of the present disclosure.
Figure 12:
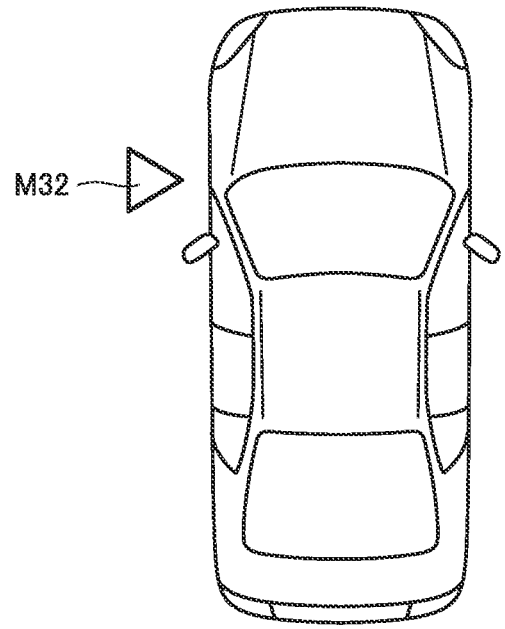
FIG. 12 shows a second example of the charging-related screen of the navigation display in the embodiment of the present disclosure.
Figure 13:
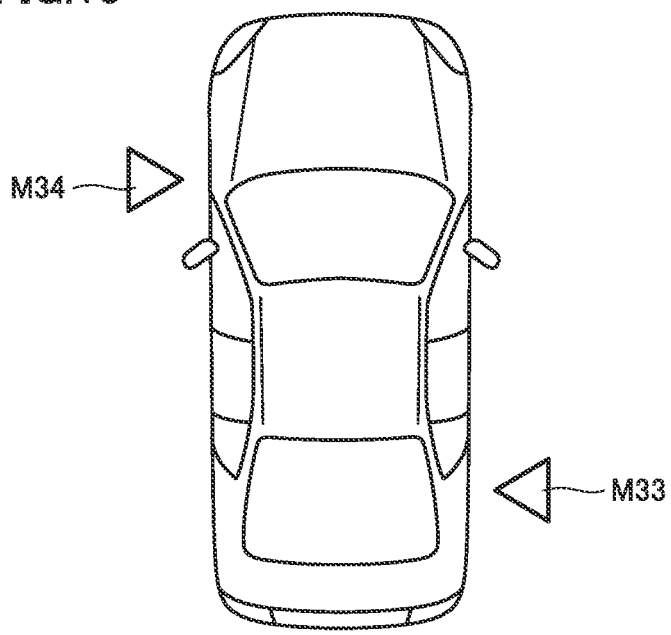
FIG. 13 shows a third example of the charging-related screen of the navigation display in the embodiment of the present disclosure.

Examples of the charging-related screen displayed in S34 will be described below with reference to FIGS. 11 to 13. On the charging-related screen of navigation display 232, an image of the vehicle body is, for example, displayed, and a prescribed mark (e.g., an arrow) is used to display at which position of the vehicle body the charging port corresponding to the corresponding power feeding facility (e.g., the corresponding power feeding facility closest to the vehicle) is located. FIG. 11 shows a first example of the charging-related screen of navigation display 232. When the corresponding power feeding facility closest to vehicle 200A or 200B is the power feeding facility for the DC method, the position of DC inlet P1 (the right side in the vehicle back part) is indicated by an arrow M31 as shown in FIG. 11. FIG. 12 shows a second example of the charging-related screen of navigation display 232. When the corresponding power feeding facility closest to vehicle 200B is the power feeding facility for the AC method, the position of AC inlet P2 (the left side in the vehicle front part) is indicated by an arrow M32 as shown in FIG. 12. FIG. 13 shows a third example of the charging-related screen of navigation display 232. When the corresponding power feeding facility closest to vehicle 200B is the power feeding facility corresponding to both the AC method and the DC method, the position of DC inlet P1 (the right side in the vehicle back part) is indicated by an arrow M33 and the position of AC inlet P2 (the left side in the vehicle front part) is indicated by an arrow M34 as shown in FIG. 13. After S34, the process is returned to the main routine.

The vehicle according to the present embodiment is configured such that vehicle ECU 50 performs the processes in FIGS. 7 and 8 above. Thus, in vehicle 200A (vehicle in which determination of NO is made in S11 in FIG. 7) including only one standard power receiver (e.g., DC inlet P1), vehicle ECU 50 can cause meter panel 221 to display the standard power receiver. In vehicle 200B (vehicle in which determination of YES is made in S11 in FIG. 7) including a plurality of power receivers (e.g., DC inlet P1 and AC inlet P2) as a result of addition of one optional power receiver (e.g., AC inlet P2) to vehicle 200A, vehicle ECU 50 can cause meter panel 221 to display the predetermined one specified power receiver (more particularly, AC inlet P2 set in S12 in FIG. 7). By using indicators M11 and M12 (see FIG. 6), vehicle ECU 50 can cause meter panel 221 to display whether the predetermined one specified power receiver is located on the right side or on the left side toward the direction of travel of the vehicle. In the present embodiment, the specified power receiver is AC inlet P2, and thus, vehicle ECU 50 can cause meter panel 221 to display that AC inlet P2 is located on the left side toward the direction of travel of the vehicle, using indicator M12. With such display, the user can be notified about in which orientation to park the vehicle with respect to the power feeding facility.

Vehicle ECU 50 also performs the process in FIG. 10 above. When the corresponding power feeding facility is present within the prescribed range around the vehicle based on the process in FIG. 10, a notification device (more particularly, navigation system 230) other than meter panel 221 also provides a notification of the position of the power receiver corresponding to the corresponding power feeding facility. The notification (e.g., display of the charging-related screen shown in FIGS. 11 to 13) by navigation system 230 makes it easier to guide the vehicle such that the vehicle can be parked at an appropriate position in an appropriate orientation with respect to the power feeding facility.

In the above-described embodiment, when the plurality of corresponding power feeding facilities are present within the prescribed peripheral range, only the information about the corresponding power feeding facility closest to the vehicle is obtained from navigation system 230 (S22 in FIG. 8). However, the present disclosure is not limited to such a configuration, and the information about all corresponding power feeding facilities present within the prescribed peripheral range may be obtained from navigation system 230. Then, at least one of meter panel 221 and an other notification device (e.g., navigation system 230) may provide a notification of a position of all of the at least one power receiver corresponding to the plurality of corresponding power feeding facilities. More specifically, when the surrounding map screen shown in FIG. 9 is displayed, the power feeding facility indicated by marker M22 is the power feeding facility for the DC method, and the power feeding facility indicated by marker M23 is the power feeding facility for the AC method in vehicle 200B, both indicators M11 and M12 may be displayed on display region M1 (FIG. 6). As a result, the user can be notified about what kind of power feeding methods the power feeding facilities present near the vehicle have.

A method for determining whether or not the corresponding power feeding facility is present within the prescribed peripheral range is not limited to the method using the information obtained from navigation system 230 (see S21 in FIG. 8) and can be changed as appropriate. For example, based on whether or not the vehicle has received a prescribed signal issued from the power feeding facility, vehicle ECU 50 may determine whether or not the corresponding power feeding facility is present within the prescribed peripheral range. Vehicle ECU 50 may also be configured to receive the information (e.g., the power feeding method) about the power feeding facility from the power feeding facility.

Figure 14:
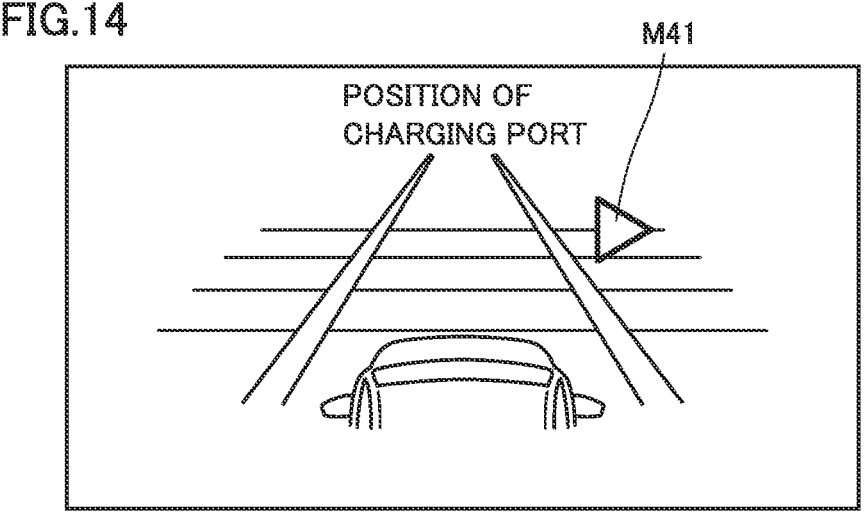
FIG. 14 shows a first example of a charging-related screen of an HUD in the embodiment of the present disclosure.
Figure 15:
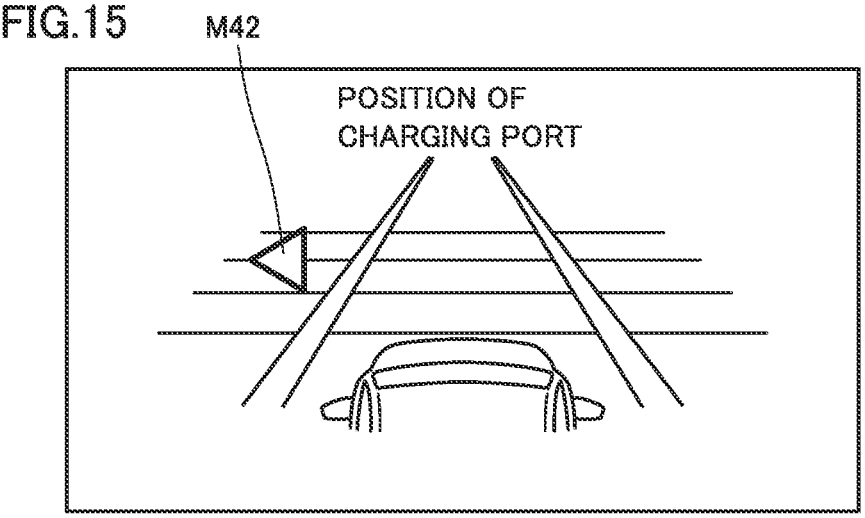
FIG. 15 shows a second example of the charging-related screen of the HUD in the embodiment of the present disclosure.

In addition to or instead of navigation display 232, display control of HUD 222 may be performed by a process similar to the process in FIG. 10. On a charging-related screen of HUD 222, an image of the vehicle front part is, for example, displayed, and a prescribed mark (e.g., an arrow) is used to display whether the charging port corresponding to the corresponding power feeding facility is located on the right side or on the left side toward the direction of travel of the vehicle. FIG. 14 shows a first example of the charging-related screen of HUD 222. When the corresponding power feeding facility present within the prescribed peripheral range of vehicle 200A or 200B is the power feeding facility for the DC method, the position of DC inlet P1 (the right side of the vehicle) is indicated by an arrow M41 as shown in FIG. 14. FIG. 15 shows a second example of the charging-related screen of HUD 222. When the corresponding power feeding facility present within the prescribed peripheral range of vehicle 200B is the power feeding facility for the AC method, the position of AC inlet P2 (the left side of the vehicle) is indicated by an arrow M42 as shown in FIG. 15.

In addition to or instead of navigation display 232 and HUD 222, mobile device 300 may notify the user of the position of the power receiver corresponding to the corresponding power feeding facility in accordance with the procedure shown in FIG. 10. Any method may be used as a method for notifying the user. Characters, an image or other information may be displayed on the display device, or a speaker may be used for notification by sound (including voice). In addition to or instead of display of navigation display 232, navigation system 230 may notify the user of the position of the power receiver corresponding to the corresponding power feeding facility by sound (including voice).

Meter panel 221 according to the present embodiment corresponds to one example of "prescribed display device" according to the present disclosure. Each of HUD 222, navigation display 232 and mobile device 300 described above corresponds to one example of "other notification device" according to the present disclosure. However, "prescribed display device" and "other notification device" are not limited to the above-described examples and can be changed as appropriate.

The positions of the power receivers in the vehicle are not limited to the positions shown in FIG. 3 and can be changed as appropriate. For example, DC inlet P1 (DC charging port) and AC inlet P2 (AC charging port) may be arranged in the front of and at the back of the vehicle. Vehicle ECU 50 may be configured to cause the prescribed display device (e.g., meter panel 221) to display whether the predetermined one specified power receiver is located in the front of or at the back of the vehicle.

Figure 16:
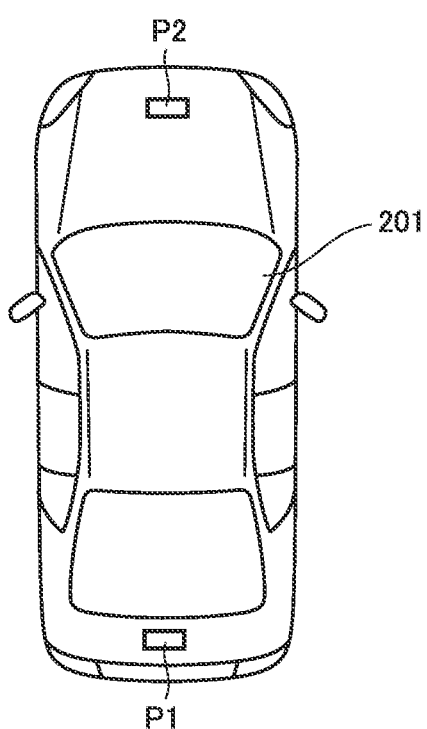
FIG. 16 shows a modification of the positions of the power receivers.

FIG. 16 shows a modification of the positions of the power receivers. Referring to FIG. 16, in the present modification, AC inlet P2 is arranged in the front of the vehicle (e.g., near an emblem of a bonnet), and DC inlet P1 is arranged at the back of the vehicle.

Figure 17:
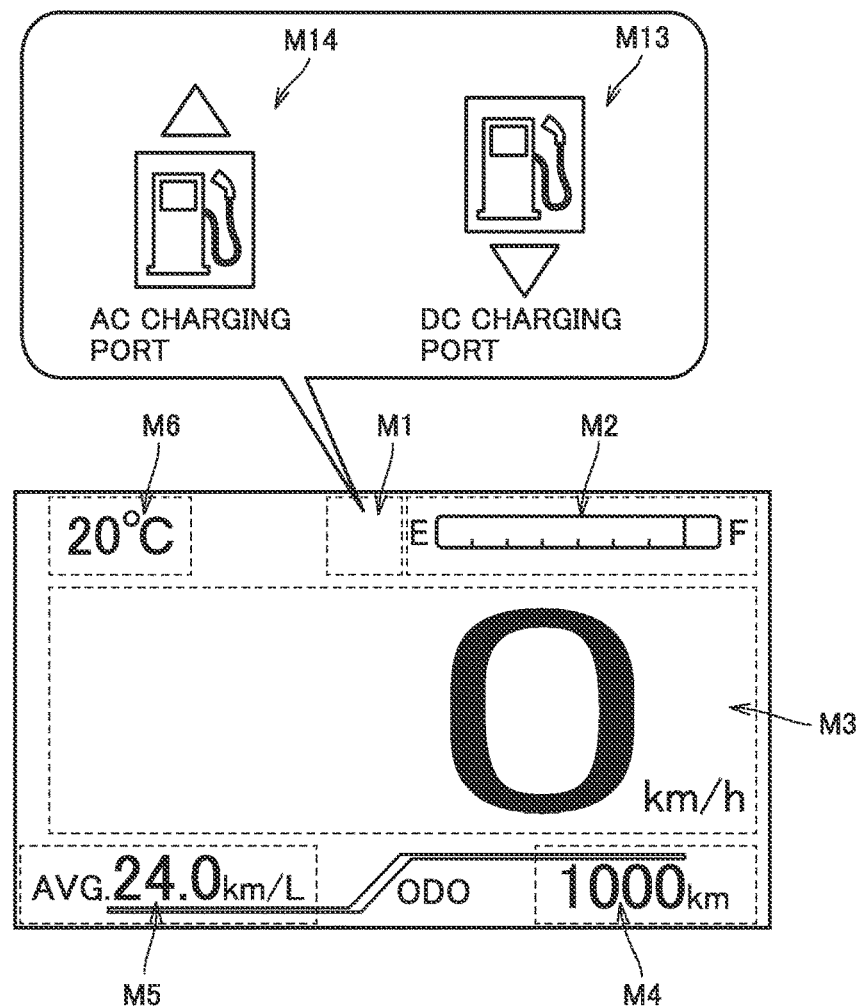
FIG. 17 shows indicators indicating the positions of the power receivers according to the modification shown in FIG. 16.

FIG. 17 shows indicators indicating the positions of the power receivers according to the above-described modification. Referring to FIG. 17, indicators M13 and M14 indicating the position of the charging port are displayed on display region M1 of the main display of meter panel 221. Indicator M13 indicates that the charging port is located at the back of the vehicle. Indicator M14 indicates that the charging port is located in the front of the vehicle. In the present modification, the position of DC inlet P1 (DC charging port) is indicated by indicator M13, and the position of AC inlet P2 (AC charging port) is indicated by indicator M14. By using indicators M13 and M14, vehicle ECU 50 can cause meter panel 221 to display whether the predetermined one specified power receiver is located in the front of or at the back of the vehicle. For example, when the specified power receiver is AC inlet P2, vehicle ECU 50 can cause meter panel 221 to display that AC inlet P2 is located in the front of the vehicle, using indicator M14. With such display, the user can be notified about in which orientation to park the vehicle with respect to the power feeding facility.

For example, when the information about whether or not the vehicle includes AC inlet P2 (optional power receiver) is preliminarily input into vehicle ECU 50 by the user, the dealer or the manufacturer, S11 in FIG. 7 (i.e., determination of whether or not the vehicle includes the optional power receiver) can be omitted. Alternatively, S21 to S23 in the process in FIG. 8 may be omitted and the normal power receiver set in S12 or S13 in FIG. 7 may be constantly displayed on meter panel 221. Alternatively, the position of the power receiver may be displayed only on meter panel 221. That is, the process in FIG. 10 may be omitted as appropriate.

The standard power receiver is not limited to DC inlet P1 and can be changed as appropriate. For example, the vehicle-mountable control device may be applied to a vehicle type in which AC inlet P2 (AC charging port) is set as the standard power receiver and DC inlet P1 (DC charging port) is set as the optional power receiver. One example (modification) of the vehicle-mountable control device applied to such a vehicle type will be described below with reference to FIG. 18.

Figure 18:
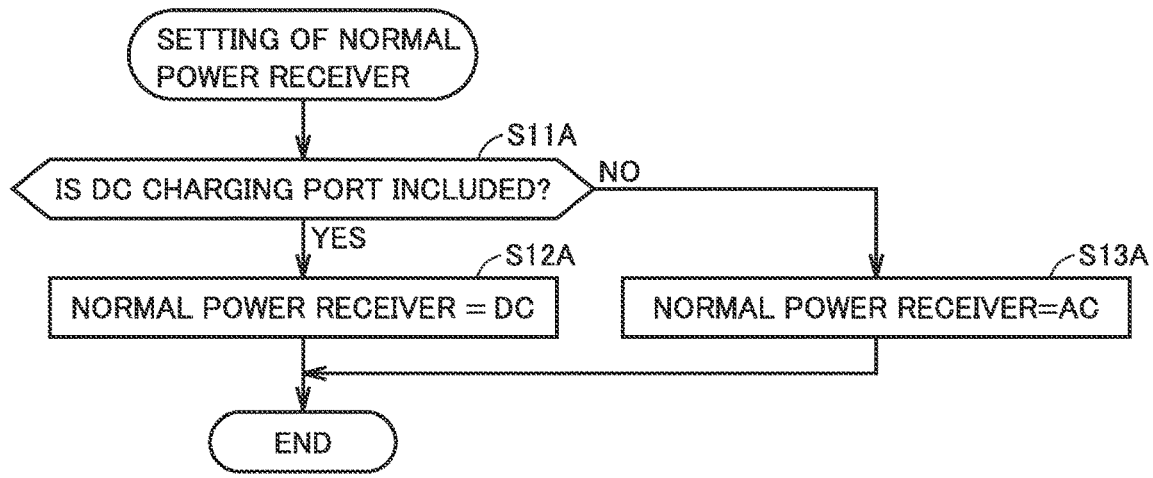
FIG. 18 is a flowchart showing a process procedure for setting a normal power receiver, which is performed in a modification of the vehicle-mountable control device applied to a vehicle type in which a charging port for DC power is set as an optional power receiver.

FIG. 18 is a flowchart showing a process procedure for setting the normal power receiver, which is performed instead of FIG. 7 in the vehicle-mountable control device according to the above-described modification. Referring to FIG. 18, in S11A, vehicle ECU 50 determines whether or not the vehicle includes DC inlet P1 (optional power receiver).

When it is determined in S11A that the vehicle includes DC inlet P1 (YES), vehicle ECU 50 sets DC inlet P1 as the normal power receiver (S12A). When it is determined in S11A that the vehicle does not include DC inlet P1 (optional power receiver) (NO), vehicle ECU 50 sets AC inlet P2 as the normal power receiver (S13A). The set normal power receiver is stored in memory device 52.

In the process in FIG. 18, the specified power receiver is DC inlet P1. Therefore, DC inlet P1 is set as the normal power receiver more preferentially than AC inlet P2. In S24 in FIG. 8, vehicle ECU 50 causes display region M1 (FIG. 6) of meter panel 221 to display the position of the normal power receiver. Vehicle ECU 50 can cause meter panel 221 to display the position of DC inlet P1, using indicator M11. The configuration in which the specified power receiver is DC inlet P1 is particularly effective for the user who uses the power feeding facility for the DC method more frequently than the power feeding facility for the AC method.

Figure 19:
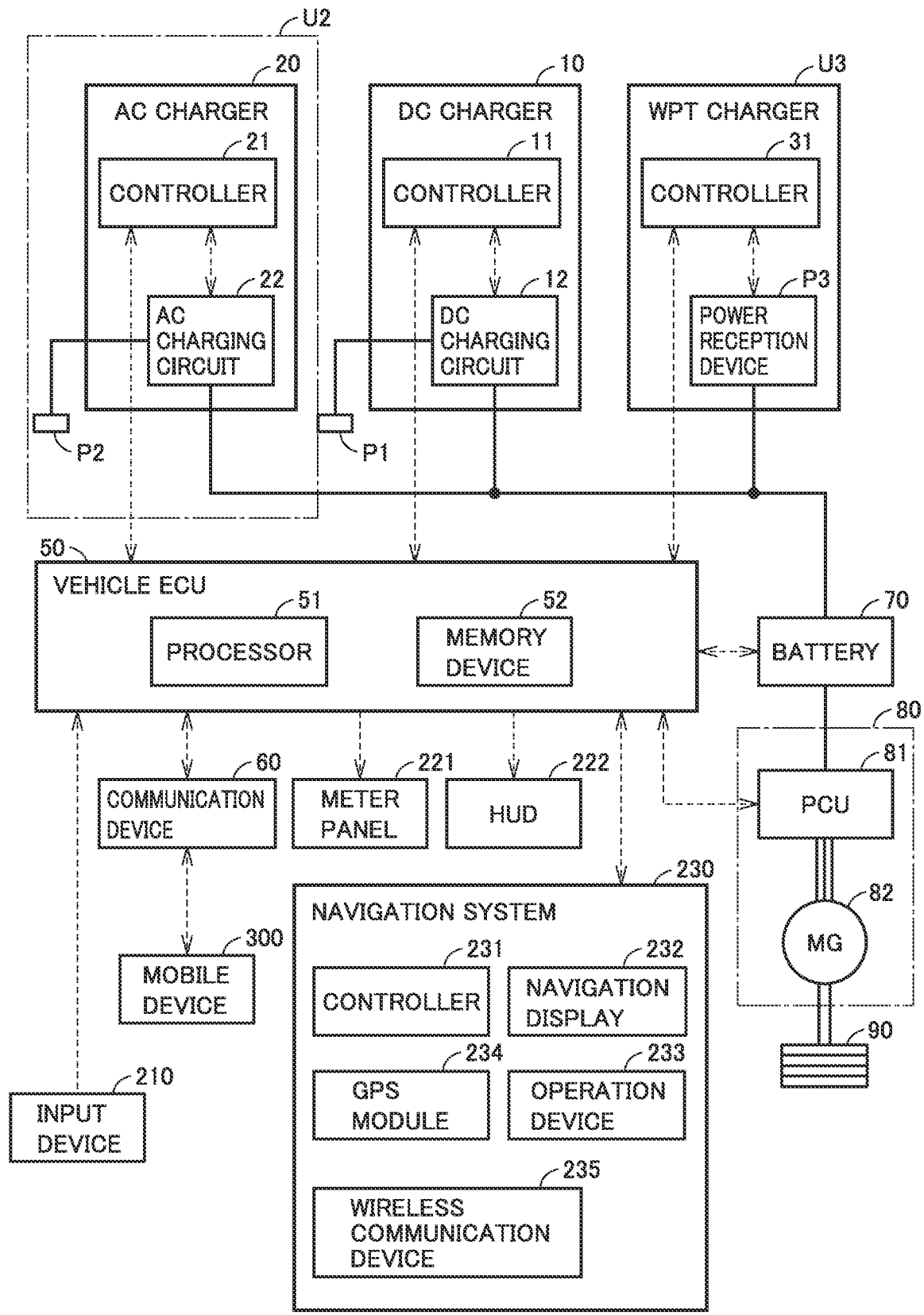
FIG. 19 shows one example of a vehicle in which a plurality of optional power receivers are set.

Two or more optional power receivers may be set in the vehicle. FIG. 19 shows one example of a vehicle in which a plurality of optional power receivers are set. Referring to FIG. 19, in the vehicle, DC inlet P1 (DC charging port) is set as a power receiver included as standard, and AC inlet P2 (AC charging port) and a power reception device P3 (power receiver for the WPT method) are set as optional power receivers. That is, the vehicle has DC inlet P1 and is configured to allow the user to select whether or not to mount each of optional module U2 including AC inlet P2 and an optional module (hereinafter, also referred to as "WPT charging module") U3 including power reception device P3.

In FIG. 19, optional module U2 is the same as optional module U2 (FIG. 2) of vehicle 200B described above. WPT charging module U3 is a vehicle-mounted charger corresponding to the WPT method (wireless method) and includes a controller 31. Controller 31 is a control device for power reception device P3. Power reception device P3 includes, for example, a power reception coil, a filter circuit, a rectifier circuit, and various sensors configured to detect a state (e.g., a temperature, a current and a voltage) of each portion (all are not shown), and a result of detection by each sensor is transmitted to controller 31 and vehicle ECU 50. Power reception device P3 is placed, for example, on a lower surface (under the floor) of the vehicle. Controller 31 is configured to control power reception device P3 in accordance with an instruction (control signal) from vehicle ECU 50. When the vehicle is supplied with electric power from a power feeding facility for the WPT method (e.g., a WPT power feeding stand), the power reception coil of power reception device P3 is aligned to face a power transmission coil of the WPT power feeding stand. Then, power reception device P3 wirelessly receives the electric power transmitted from the power transmission coil.

FIG. 20 is a flowchart showing a process procedure for setting the normal power receiver, which is performed instead of FIG. 7 in the vehicle-mountable control device applied to the above-described vehicle.

Referring to FIG. 20 together with FIG. 19, in S41, vehicle ECU 50 determines whether or not the vehicle includes AC inlet P2. When it is determined in S41 that the vehicle includes AC inlet P2 (YES), vehicle ECU 50 sets AC inlet P2 as the normal power receiver (S42). When it is determined in S41 that the vehicle does not include AC inlet P2 (NO), vehicle ECU 50 determines whether or not the vehicle includes power reception device P3 (and further, the WPT charging module) in S43. When it is determined in S43 that the vehicle includes power reception device P3 (YES), vehicle ECU 50 sets power reception device P3 as the normal power receiver (S44). When it is determined in S43 that the vehicle does not include power reception device P3 (NO), vehicle ECU 50 sets DC inlet P1 as the normal power receiver (S45). The set normal power receiver is stored in memory device 52. Whether or not the vehicle includes AC inlet P2 and whether or not the vehicle includes power reception device P3 can be determined based on the presence or absence of the response signals from controllers 21 and 31, respectively.

Vehicle ECU 50 is configured to perform the process in FIG. 20 above instead of the process in FIG. 7 above. Therefore, even when any optional power receiver is added, vehicle ECU 50 can cause meter panel 221 to display the predetermined one specified power receiver. More specifically, in the process in FIG. 20, AC inlet P2 is set as the specified power receiver when at least AC inlet P2 of the optional power receivers (AC inlet P2 and power reception device P3) is added to the vehicle, and power reception device P3 is set as the specified power receiver when only power reception device P3 is added to the vehicle. As described above, which optional power receiver is displayed on meter panel 221 when the vehicle includes the plurality of optional power receivers may be determined based on the predetermined order of priority (in the process in FIG. 20, higher priority is given to AC inlet P2 than power reception device P3).

Power conversion performed in each of DC charging circuit 12, AC charging circuit 22 and power reception device P3 can be changed as appropriate. For example, at least one of DC charging circuit 12, AC charging circuit 22 and power reception device P3 may include a DC/DC converter and be configured to perform transformation as the power conversion.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle-mountable control device mountable on a vehicle including at least one power receiver configured to receive electric power supplied from an external power supply, the vehicle-mountable control device comprising a controller configured to:
    cause a prescribed display device to display a position of the power receiver included in the vehicle,
    when the vehicle includes a plurality of power receivers, cause the prescribed display device to display a position of a predetermined one power receiver of the plurality of power receivers,
    determine whether a power feeding facility for a power feeding method corresponding to the at least one power receiver included in the vehicle is present within a prescribed range around the vehicle, and
    upon determination that a power feeding facility for a power feeding method corresponding to the at least one power receiver included in the vehicle is present within the prescribed range around the vehicle, cause at least one of the prescribed display device and an other notification device to provide a notification of the at least one power receiver corresponding to the power feeding method of the power feeding facility within the prescribed range.

2. The vehicle-mountable control device according to claim 1, wherein
    the at least one power receiver includes a charging port connectable to a charging cable,
    the vehicle is configured to charge a vehicle-mounted battery with the electric power supplied from the external power supply to the charging port through the charging cable,
    the vehicle includes at least a charging port for DC power,
    the vehicle-mountable control device further comprising:
    a determination processor configured to determine whether or not the vehicle further includes a charging port for AC power; and
    a memory configured to store first charging port information indicating a position of the charging port for DC power and second charging port information indicating a position of the charging port for AC power,
    the controller is configured to cause the prescribed display device to display the position of the charging port for DC power by using the first charging port information, when the determination processor determines that the vehicle does not include the charging port for AC power.

3. The vehicle-mountable control device according to claim 2, wherein
    the predetermined one power receiver is the charging port for AC power, and
    the controller is configured to cause the prescribed display device to display the position of the charging port for AC power by using the second charging port information, when the determination processor determines that the vehicle includes the charging port for AC power.

4. The vehicle-mountable control device according to claim 1, wherein
    the at least one power receiver includes a charging port connectable to a charging cable,
    the vehicle is configured to charge a vehicle-mounted battery with the electric power supplied from the external power supply to the charging port through the charging cable,
    the vehicle includes at least a charging port for AC power,
    the vehicle-mountable control device further comprising:
    a determination processor configured to determine whether or not the vehicle further includes a charging port for DC power; and
    a memory configured to store first charging port information indicating a position of the charging port for DC power and second charging port information indicating a position of the charging port for AC power,
    the controller is configured to cause the prescribed display device to display the position of the charging port for AC power by using the second charging port information, when the determination processor determines that the vehicle does not include the charging port for DC power.

5. The vehicle-mountable control device according to claim 4, wherein
    the predetermined one power receiver is the charging port for DC power, and
    the controller is configured to cause the prescribed display device to display the position of the charging port for DC power by using the first charging port information, when the determination processor determines that the vehicle includes the charging port for DC power.

6. The vehicle-mountable control device according to claim 1, wherein the controller is configured to cause the prescribed display device to display whether the predetermined one power receiver is located on a right side or on a left side toward a direction of travel of the vehicle.

7. The vehicle-mountable control device according to claim 1, wherein
the controller is configured to cause the prescribed display device to display whether the predetermined one power receiver is located in a front of or at a back of the vehicle.

8. The vehicle-mountable control device according to claim 1, wherein
the controller is configured to, when a plurality of power feeding facilities for power feeding methods corresponding to the at least one power receiver included in the vehicle are present within the prescribed range around the vehicle, cause at least one of the prescribed display device and the other notification device to provide a notification of a position of all of the at least one power receiver corresponding to the plurality of power feeding facilities within the prescribed range.

9. The vehicle-mountable control device according to claim 1, wherein
the prescribed display device is a meter panel of the vehicle,
the controller is configured to, when no power feeding facility for the power feeding method corresponding to the at least one power receiver included in the vehicle is present within the prescribed range around the vehicle, cause the prescribed display device to display the position of the predetermined one power receiver, and
the controller is configured to, when a power feeding facility for the power feeding method corresponding to the at least one power receiver included in the vehicle is present within the prescribed range around the vehicle, cause the prescribed display device to display the position of the at least one power receiver corresponding to the power feeding facility within the prescribed range.

10. The vehicle-mountable control device according to claim 1, wherein
the other notification device includes at least one of a navigation system provided in the vehicle, a display provided on a windshield of the vehicle, and a mobile device, and
the controller is configured to, when a power feeding facility for the power feeding method corresponding to the at least one power receiver included in the vehicle is present within the prescribed range around the vehicle, cause the other notification device to provide a notification of the position of the at least one power receiver corresponding to the power feeding facility within the prescribed range.

11. A vehicle comprising the vehicle-mountable control device as recited in claim 1, and at least one power receiver configured to receive electric power supplied from an external power supply.

* * * * *